United States Patent
Medard et al.

(10) Patent No.: US 9,369,541 B2
(45) Date of Patent: Jun. 14, 2016

(54) METHOD AND APPARATUS FOR IMPLEMENTING DISTRIBUTED CONTENT CACHING IN A CONTENT DELIVERY NETWORK

(71) Applicant: Massachusetts Institute of Technology, Cambridge, MA (US)

(72) Inventors: Muriel Medard, Belmont, MA (US); Flavio du Pin Calmon, Cambridge, MA (US); Weifei Zeng, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 113 days.

(21) Appl. No.: 14/087,595

(22) Filed: Nov. 22, 2013

(65) Prior Publication Data

US 2014/0280454 A1    Sep. 18, 2014

Related U.S. Application Data

(60) Provisional application No. 61/783,666, filed on Mar. 14, 2013.

(51) Int. Cl.
*G06F 15/16* (2006.01)
*H04L 29/08* (2006.01)

(52) U.S. Cl.
CPC ............ *H04L 67/2852* (2013.01); *H04L 67/06* (2013.01); *H04L 67/1095* (2013.01); *H04L 67/1097* (2013.01)

(58) Field of Classification Search
CPC . H04L 67/06; H04L 67/1095; H04L 67/1097; H04L 67/2852
See application file for complete search history.

(56) References Cited

U.S. PATENT DOCUMENTS

| | | |
|---|---|---|
| 5,577,056 A | 11/1996 | Malik et al. |
| 6,128,773 A | 10/2000 | Snider |
| 6,621,851 B1 | 9/2003 | Agee et al. |
| 6,885,653 B2 | 4/2005 | Choi et al. |
| 7,064,489 B2 | 6/2006 | Price |
| 7,071,853 B2 | 7/2006 | Price |
| 7,095,343 B2 | 8/2006 | Xie et al. |

(Continued)

FOREIGN PATENT DOCUMENTS

| | | |
|---|---|---|
| EP | 1 638 239 A1 | 3/2006 |
| WO | WO 2007/109216 A1 | 9/2007 |

(Continued)

OTHER PUBLICATIONS

PCT Search Report of the ISA for PCT/US 14/24386 dated Aug. 1, 2014 3 pages.

(Continued)

*Primary Examiner* — Mohamed Wasel
(74) *Attorney, Agent, or Firm* — Daly, Crowley, Mofford & Durkee, LLP

(57) ABSTRACT

Distributed content caching is implemented in an efficient, low cost manner within a content delivery network (CDN). In various embodiments, content is identified for caching at a number of gateway devices within a CDN by minimizing a cost function associated with content delivery in the network. The cost function may take into consideration costs of delivering content to users from gateway devices as well as costs associated with delivering content to users from centralized locations of a CDN.

19 Claims, 5 Drawing Sheets

(56) References Cited

U.S. PATENT DOCUMENTS

| | | | |
|---|---|---|---|
| 7,164,691 B2 | 1/2007 | Knapp et al. | |
| 7,283,564 B2 | 10/2007 | Knapp et al. | |
| 7,349,440 B1 | 3/2008 | Chou et al. | |
| 7,408,938 B1 | 8/2008 | Chou et al. | |
| 7,414,978 B2 | 8/2008 | Lun et al. | |
| 7,529,198 B2 | 5/2009 | Jain et al. | |
| 7,706,365 B2 | 4/2010 | Effros et al. | |
| 7,760,728 B2 | 7/2010 | Chou et al. | |
| 7,821,980 B2 | 10/2010 | Chakrabarti et al. | |
| 7,876,677 B2 | 1/2011 | Cheshire | |
| 7,912,003 B2 | 3/2011 | Radunovic et al. | |
| 7,945,842 B2 | 5/2011 | He et al. | |
| 8,040,836 B2 | 10/2011 | Wu et al. | |
| 8,068,426 B2 | 11/2011 | Sundararajan et al. | |
| 8,130,776 B1 | 3/2012 | Sundararajan et al. | |
| 8,279,781 B2 | 10/2012 | Lucani et al. | |
| 8,451,756 B2 | 5/2013 | Lucani et al. | |
| 8,482,441 B2 | 7/2013 | Medard et al. | |
| 8,504,504 B2 | 8/2013 | Liu | |
| 8,571,214 B2 | 10/2013 | Lima et al. | |
| 8,892,686 B1* | 11/2014 | Thibeault | H04L 67/2828 709/217 |
| 9,043,432 B2* | 5/2015 | Ahopelto | H04L 12/5835 370/238 |
| 2003/0055614 A1 | 3/2003 | Pelikan | |
| 2003/0214951 A1 | 11/2003 | Joshi et al. | |
| 2004/0203752 A1 | 10/2004 | Wojaczynski et al. | |
| 2005/0010675 A1 | 1/2005 | Jaggi et al. | |
| 2005/0078653 A1 | 4/2005 | Agashe et al. | |
| 2005/0096040 A1* | 5/2005 | Haberman | H04W 4/06 455/422.1 |
| 2005/0152391 A1 | 7/2005 | Effros et al. | |
| 2005/0188073 A1* | 8/2005 | Nakamichi | H04L 45/00 709/223 |
| 2005/0203917 A1* | 9/2005 | Freeberg | H04L 67/06 |
| 2005/0251721 A1 | 11/2005 | Ramesh et al. | |
| 2006/0020560 A1 | 1/2006 | Rodriguez et al. | |
| 2006/0146791 A1 | 7/2006 | Deb et al. | |
| 2006/0224760 A1 | 10/2006 | Yu et al. | |
| 2007/0046686 A1 | 3/2007 | Keller | |
| 2007/0116027 A1 | 5/2007 | Ciavaglia et al. | |
| 2007/0274324 A1 | 11/2007 | Wu et al. | |
| 2008/0043676 A1 | 2/2008 | Mousseau et al. | |
| 2008/0049746 A1 | 2/2008 | Morrill et al. | |
| 2008/0123579 A1 | 5/2008 | Kozat et al. | |
| 2008/0147484 A1* | 6/2008 | Davis | G06Q 30/02 705/14.53 |
| 2008/0259796 A1 | 10/2008 | Abousleman et al. | |
| 2008/0291834 A1 | 11/2008 | Chou et al. | |
| 2008/0320363 A1 | 12/2008 | He | |
| 2009/0003216 A1 | 1/2009 | Radunovic et al. | |
| 2009/0042508 A1* | 2/2009 | Wakasa | G06Q 10/00 455/3.06 |
| 2009/0135717 A1 | 5/2009 | Kamal et al. | |
| 2009/0153576 A1 | 6/2009 | Keller | |
| 2009/0175320 A1 | 7/2009 | Haustein et al. | |
| 2009/0198829 A1* | 8/2009 | Sengupta | H04N 21/632 709/233 |
| 2009/0207930 A1 | 8/2009 | Sirkeci et al. | |
| 2009/0238097 A1 | 9/2009 | Le Bars et al. | |
| 2009/0248898 A1 | 10/2009 | Gkantsidis et al. | |
| 2009/0285148 A1 | 11/2009 | Luo et al. | |
| 2009/0310582 A1 | 12/2009 | Beser | |
| 2009/0313459 A1 | 12/2009 | Horvath | |
| 2009/0316763 A1 | 12/2009 | Erkip et al. | |
| 2010/0014669 A1 | 1/2010 | Jiang | |
| 2010/0046371 A1 | 2/2010 | Sundararajan et al. | |
| 2010/0057636 A1 | 3/2010 | Brennan | |
| 2010/0111165 A1 | 5/2010 | Kim et al. | |
| 2010/0146357 A1 | 6/2010 | Larsson | |
| 2011/0238855 A1 | 9/2011 | Korsunsky et al. | |
| 2012/0057636 A1 | 3/2012 | Tian et al. | |
| 2012/0184203 A1 | 7/2012 | Tulino et al. | |
| 2012/0198075 A1 | 8/2012 | Crowe et al. | |
| 2012/0218891 A1 | 8/2012 | Sundararajan et al. | |
| 2012/0300692 A1 | 11/2012 | Sfar et al. | |
| 2013/0097277 A1* | 4/2013 | Kim | H04L 47/00 709/217 |
| 2013/0107764 A1 | 5/2013 | Zeger et al. | |
| 2013/0114481 A1 | 5/2013 | Kim et al. | |
| 2013/0114611 A1 | 5/2013 | Zeger et al. | |
| 2013/0195106 A1 | 8/2013 | Calmon et al. | |
| 2014/0029432 A1* | 1/2014 | Vasseur | H04L 41/5025 370/236 |
| 2014/0064296 A1 | 3/2014 | Haeupler et al. | |
| 2014/0155025 A1* | 6/2014 | Parker | H04W 4/24 455/406 |
| 2014/0185803 A1 | 7/2014 | Lima et al. | |
| 2014/0268398 A1 | 9/2014 | Medard et al. | |
| 2014/0269485 A1 | 9/2014 | Medard et al. | |
| 2014/0269503 A1 | 9/2014 | Medard et al. | |
| 2014/0269505 A1 | 9/2014 | Medard et al. | |
| 2014/0280395 A1 | 9/2014 | Medard et al. | |
| 2014/0280454 A1 | 9/2014 | Medard et al. | |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2010/025362 A2 | 3/2010 |
| WO | WO 2010/025362 A3 | 3/2010 |
| WO | WO 2011/043754 A1 | 4/2011 |
| WO | WO 2011/119909 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |
| WO | WO 2014/159570 A1 | 10/2014 |
| WO | WO 2014/1061094 A3 | 10/2014 |

OTHER PUBLICATIONS

PCT Written Opinion of the ISA for PCT/US 14/24386 dated Aug. 1, 2014 8 pages.

Armstrong, et al.; "Distributed Storage with Communication Costs;" IEEE Forty-Ninth Annual Allerton Conference—Allerton House; Sep. 28-30, 2011; pp. 1358-1365.

Cha, et al.; "I Tube, You Tube, Everybody Tubes: Analyzing the World's Largest User Generated Content Video System;" 7$^{th}$ ACM GIGCOMM Confernece on Internet Measurement; IMC'07; Oct. 24-26, 2007; 13 pages.

Golrezaei, et al.; "FremtoCaching: Wireless Video Content Delivery Through Distributed Caching Helpers;" arXiv:1109.4179v3; Apr. 7, 2012; pp. 1-11.

Grant, et al.; "Graph Implementation for Nonsmooth Convex Programs;" LNCIS 371; Springer-Verlag Limited; Jan. 2008; pp. 95-110.

Ho, et al.; "A Random Linear Network Coding Approach to Multicast;" IEEE Transactions on Infromation Theroy; vol. 52; No. 10; Oct. 2006; pp. 4413-4430.

Koetter, et al.; "An Algebraic Approach to Network Coding;" IEEE/ACM Transactions on Networking; vol. 11; No. 5; Oct. 2003; pp. 782-795.

Valancius, et al.; "Greening the Internet with Nano Data Centers;" Proc. 5$^{th}$ International Conference on Emerging Networking Experiments and Technologies; CoNEXT 2009; ACM 2009; Dec. 1-4, 2009; pp. 37-48.

Borst, et al.; "Distributed Caching Algorithms for Content Distribution Networks"; IEEE INFOCOM; 2010 Proceedings IEEE; Mar. 14-19, 2010; 9 pages.

Borst, et al.; "Distributed Caching Algorithms for Content Distribution Networks;" Power Point Presentation; BCAM Seminar; Bilbao, Sep. 30, 2010; 36 pages.

"Data Service Options for Spread Spectrum Systems: Radio Link Protocol Type 3;" 3GPP2 C.S0017-010-A; Version 2.0; Sep. 2005.

"Guest Editorial Wireless Video Transmission;" IEEE Journal on Selected Areas in Communications: vol. 28; No. 3; Apr. 2010; pp. 297-298.

Abichar, et al.; "WiMax vs. LTE: Who Will Lead the Broadband Mobile Internet?;" Mobile Computing; IEEE Computer Society; IT Pro May/Jun. 2010; pp. 26-32.

(56) References Cited

OTHER PUBLICATIONS

AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommuncations (JAST); Aug. 2011; pp. 39-43.
Acedanski, et al.; "How Good is Random Linear Coding Based Distributed Network Storage?;" Proc. $1^{st}$ Workshop on Network Coding, Theory and Applications (Netcod'05); Apr. 2005; 6 pages.
Adamson, et al.; "Multicast Negative-Acknowledgment (NACK) Building Blocks;" Internet Engineering Task Force (IETF), RFC; vol. 5401; Nov. 2008; 42 pages.
Adamson, et al.; "NACK-Oriented Reliable (NORM) Transport Protocol;" Internet Engineering Task Force (IETF); RFC; vol. 5740; Nov. 2009; 94 pages.
Adamson, et al.; "Quantative Prediction of NACK-Oriented Reliable Multicast (NORM) Feedback;" Proceedings, MILCOM 2000; vol. 2; Oct. 2002; 6 pages.
Ahlswede, et al.; "Network Information Flow," IEEE Transactions on Information Theory; vol. 46; No. 4; Jul. 2000; pp. 1204-1216.
Ahmed, et al.; "On the Scaling Law of Network Coding Gains in Wireless Networks;" IEEE; MILCOM 2007; Oct. 2007; 7 pages.
Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.
Armstrong, et al.; "Distributed Storage with Communcation Costs;" IEEE Forty-Ninth Annual Allerton Conference—Allerton House; Sep. 28-30, 2011; pp. 1358-1365.
Awerbuch, et al; "On-Line Generalized Steiner Problem;" Proceedings of the $7^{th}$ Annual ACM-SIAM Symposium on Discrete Algorithms; pp. 1-12; 1996.
Baek, et al.; "The International Journal of Computer and Telecommunications Networking;" vol. 56; Issue 6; Apr. 2012; pp. 1745-1762.
Baron, et al.; "Coding Schemes for Multislot Messages in Multichannel ALOHA With Deadlines;" IEEE Transactions on Wireless Communications; vol. 1; No. 2; Apr. 2002; pp. 292-301.
Bellare, et al.; "A Concrete Security Treatment of Symmetric Encryption: Analysis of the DES Modes of Operation;" Proc. $38^{th}$ Annual Symposium on Foundations of Computer Science; Oct. 1997; pp. 1-32.
Berman, et al.; "Improved Approximations for the Steiner Tree Problem;" Journal of Algorithms; Chapter 39; pp. 325-334.
Bhadra, et al.; "Looking at Large Networks: Coding vs. Queuing;" Proc. of the $25^{th}$ IEEE International Conference on Computer Communications (INFOCOM); Apr. 2006; 12 pages.
Bharath-Kumar, et al.; "Routing to Multiple Destinations in Computer Networks;" IEEE Transactions on Communications; vol. Com-31; No. 3; Mar. 1983; pp. 343-351.
Bhargava, et al.; "Forward Error Correction Coding; Mobile Communications Handbook;" Part 1: Basic Principals; 1999; 18 pages.
Birk, et al.; "Judicious Use of Redundant Transmissions in Multichannel ALOHA Networks with Deadlines;" IEEE Journal on Selected Areas in Communications; vol. 17; No, 2; Feb. 1999; pp. 257-269.
Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.
Bonnin, et al.; "Automatic Multi-Interface Management Through Profile Handling;" Springer; Mobile Networks and Applications; Feb. 2009; pp. 4-17.
Borokhovich, et al.; "Tight bounds for Algebraic Gossip on Graphs;" Proc. of the IEEE International Symposium on Information Theory (ISIT); Jun. 13-18, 2010; 14 pages.
Bui, et al.; "A Markovian Approach to Multipath Data Transfer in Overlay Networks;" IEEE Transactions on Parallel and Distributed Systems; vol. 21; No. 10; Oct. 2010; pp. 1398-1411.
Cai, et al.; "Secure Network Coding;" IEEE; ISIT; Jun. 30-Jul. 5, 202; p. 323.
Calmon; et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al; "Minimum Entrophy Combinatorial Optimization Probiems;" Data Structure and Algorithms, Discrete Mathematics; Aug. 17, 2010; pp. 1-16.
Castro, et al.; "Upper and Lower Error Bounds for Active Learning;" The 44'th Annual Allerton Conference on Communication, Control and Computing; vol. 2, No, 2.1; 2006, 10 pages.
Celik, et al.; "MAC for Networks with Multipacket Reception Capability and Spatially Distributed Nodes;"Proc. IEEE INFOCOM 2008; Apr. 2008; 9 pages.
Celik; "Distributed MAC Protocol for Networks with Multipacket Reception Capability and Spatially Distributed Nodes;" Master's Thesis; MIT Department of Electrical Engineering and Computer Science; May 2007; 127 pages.
Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 pages.
Chakrabarti, et al.; "Approximation Algorithms for the Unsplittable Flow Problem;" Proceedings of the $5^{th}$ International Workshop on Approximation Algorithms for Combinatorial Optimization; Sep. 2005, pp. 1-27.
Chakrabarti, et al.; Approximation Algorithms for the Unsplittable Flow Problem; Algorithmica (2007); Springer Science—Business Media, Aug. 2006; 16 pages.
Charikar, et al.; "Approximation Algorithms for Directed Steiner Problems;" Proceedings of the $9^{th}$ ACM-SIAM Symposium on Discrete Algorithms, pp. 1-15; 1998.
Chen, et al.; "Pipeline Network Coding for Multicast Streams;" ICMU Org.; 2010; 7 pages.
Chou, et al.; "FEC and Pseudo-ARQ for Receiver-driven Layered Multicast of Audio and Video;" Data Compression Conference (DCC), 2000; Proceedings; Jan. 2000; 10 pages.
Chou, et al. ; "Practical Network Coding;" Proceedings of the $41^{st}$ Annual Allerton Conference on Communication, Control, and Computing; Oct. 2003; 10 pages.
Cisco Visual Networking Index; Forecast and Methodology; 2009-2014; White Paper; Jun. 2, 2010; pp. 1-17.
Cloud, et al.: "Co-Designing Multi-Packet Reception, Network Coding, and MAC Using a Simple Predictive Model;" arXiv:1101.5779v1 [cs.NI]; Submitted to W.Opt 2011;Jan. 30, 2011; pp. 1-8.
Cloud, et al.; "Effects of MAC approaches on non-monotonic saturation with COPE-a simple case study;" Military Communication Conference, 2011—MILCOM; Aug. 11, 2011; 7 pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; pp. 1-8.
Cloud, et al.; "Multi-Path TCP with Network Coding;" Wireless@mit—MIT Center for Wireless Networks and Mobile Computing; 2012 Inaugural Retreat; Oct. 10-11, 2012.
Cloud, et al; U.S. Appl. No. 13/654,953, filed Oct. 18, 2012.
Costa, et al.; "Informed Network Coding for Minimum Decoding Delay;" Fifth IEEE International Conference on Mobile Ad-hoc and Sensor Systems; Sep. 2008; pp. 80-91.
Coughlin, et al.; Years of Destiny: HDD Capital Spending and Technology Developments from 2012-2016; IEEE Santa Clara Valley Magnetics Society; Jun. 19, 2012; pp. 1-28.
Dana, et al.; "Capacity of Wireless Erasure Networks; IEEE Transactions on Information Theory;" vol. 52; No. 3; Mar. 2006; pp. 789-804.
Dana, et al.; "Capacity of Wireless Erasure Networks;" Jan. 2006; 41 pages.
Deb, et al.; "Algebraic Gossip: A Network Coding Approach to Optimal Multiple Rumor Mongering;" Proc. of the $42^{nd}$ Allerton Conference on Communication, Control, and Computing; Jan. 2004; 10 pages.

(56) References Cited

OTHER PUBLICATIONS

Deb, et al.; "On Random Network Coding Based Information Dissemination;" Proc. of the IEEE International Symposium on Information Theory (ISIT): Sep. 4-9, 2005; 5 pages.
Demers, et al.; "Epidemic Algorithms for Replicated Database Maintenance;" PODC '87 Proceedings of the sixth annual ACM Symposium on Principles of distributed computing; Jan. 1987; pp. 1-12.
Dias, et al.; "Performance Analysis of HARQ in WiMax Networks Considering Imperfect Channel Estimation;" The $7^{th}$ International Telecommunications Symposium (ITS 2010); 2010; 5 pages.
Dimakis, et al.; "A Survey on Network Codes for Distributed Storage;" Proceedings of the IEEE; vol. 99; No. 3; Mar. 2011; pp. 476-489.
Dimakis, et al.; "Network Coding for Distributed Storage Systems;" IEEE/ACM Transactions on Information Theory; vol. 56; No. 9; pp. 1-13.
Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.
Effros; Distortion-Rate Bounds for Fixed-and Variable-Rate Multiresolution Source Codes; IEEE Transactions on Information Theory; vol. 45, No. 6; Sep. 1999; pp. 1887-1910.
Effros; "Universal Multiresolution Source Codes;" IEEE Transactions on Information Theory; vol. 47; No. 6; Sep. 2001; pp. 2113-2129.
El Bahri, et al.; "Performance Comparison of Type I, II and III Hybrid ARQ Schemes over AWGN Channels;" 2004 IEEE International Conference on industrial Technology (ICIT); vol. 3; Dec. 8-10, 2004; pp. 1417-1421.
Eryilmaz, et al.; On Delay Performance Gains From Network Coding; Information Sciences and Systems; 2006 $40^{th}$ Annual Conference on Mar. 22-24, 2008; 7 pages.
Fan, et al.; "Reliable Relay Assisted Wireless Multicast Using Network Coding;" IEEE Journal on Selected Areas in communications; vol. 27; No. 5; Jun. 2009; pp. 749-762.
Feizi, et al.; "Locally Adaptive Sampling;" Communication, Control, and Computing; 2010; $48^{th}$ Annual Allerton Conference, IEEE; Sep. 29, 2010; pp. 152-159.
Feizi, et al.; "On Network Functional Compression;" arXiv online repository; URL: http://arxiv.org/pdf/1011.5496v2.pdf; Nov. 30, 2010p pp. 1-60.
Feizi, et al.; "When Do Only Sources Need to Compute? On Functional Compression in Tree Networks;" $47^{th}$ Annual Allerton Conference, IEEE; Sep. 30, 2009; pp. 447-454.
Feizi, et al; "Cases Where Finding a Minimum Entropy Coloring of a Characteristic Graph is a Polynomial Time Problem;" IEEE International Symposium on Information Theory; Jun. 13, 2010; pp. 116-120.
Ferner, et al.; "Toward Sustainable Networking: Storage Area Networks with Network Coding;" Fiftieth Annual Allerton Conference; IEEE; Oct. 1-5, 2012; pp. 517-524.
Ford; "Architectural Guidelines for Multipath TCP Development;" Internet Engineering Task Force; Internet-Draft; Dec. 8, 2010; 17 pages.
Ford; "TCP Extension for Multipath Operation with Multiple Addresses draft-ford-mptcp-multiaddressed-03;" Internet Engineering Task Force; Internet-Draft; Mar. 8, 2010; 35 pages.
Fragouli, et al.; "Wireless Network Coding: Opporunitites & Challenges;" MILCOM; Oct. 2007; 8 pages.
Frossard, et al.; "Media Streaming With Network Diversity;" Invited Paper; Proceedings of the IEEE; vol. 96, No. 1, Jan. 2008; pp. 39-53.
Galbraith, et al.; (HGST); "Interactive Detection Read Channel Technology in Hard Disk Drives;" Whitepaper; Nov. 2008; 8 pages.
Garcia-Luna-Aceves; "Challenges: Towards Truly Scalable Ad Hoc Networks;" MobiCom 2007; Sep. 2007; pp. 207-214.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.
Ghaderi, et al.; Reliability Gain of Network Coding in Lossy Wireless Networks; Infocom 2008; The $27^{th}$ Conference on Computer Communications IEEE; Apr. 13-18, 2008; 5 pages.
Gheorghiu, et al.; "Multipath TCP with Network Coding for Wireless Mesh Netwoks;" IEEE Communications (ICC) 2010 International Conference; May 23-27, 2010; 5 pages.
Gheorghiu, et al., "On the Performance of Network Coding in Multi-Resolution Wireless Video Streaming;" IEEE International Symposium on Jun. 9-11, 2010; 6 pages.
Ghez, et al.; "Stability Properties of Slotted Aloha with Multipacket Reception Capability;" IEEE Transactions on Automatic Control; vol. 33; No. 7; Jul. 1988; pp. 640-649.
Gkantsidis, et al.; "Cooperative Security for Network Coding File Distribution;" Proc. IEEE Infocom; Apr. 2006; 13 pages.
Gollakota, et al.; "ZigZag Decoding: Combating Hidden Terminals in Wireless Networks;" SIGCOMM 08; Aug. 17-22; pp. 159-170.
Golrezaei, et al.; "FemtoCaching: Wireless Video Content Delivery Through Distriubted Caching Helpers;" arXiv:1109.4179v2; Apr. 7, 2012; pp. 1-11.
Grant, et al.; "Graph Implemenation for Nonsmooth Convex Programs;" LNCIS 371; Springer-Verlag Limited; Jan. 2008; pp. 95-110.
Gupta; "The Capacity of Wireless Networks;" IEEE Transactions on Information Theory; vol. 46; No. 2; Mar. 2000; pp. 388-404.
Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.
Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.
Haeupler; "Analyzing Network Coding Gossip Made Easy;" Proc. of the $43^{rd}$ Symposium on Theory of Computing (STOC); Jan. 2011, 13 pages.
Haeupler, et al.; "Optimality of Network Coding in Packet Networks;" ArXiv, Feb. 17, 2011; 5 pages.
Haley, et al.; "Reversible Low-Density Parity-Check Codes;" IEEE Transactions on Information Theory; vol. 55; No. 5; May 2009; pp. 2016-2036.
Halloush, et al.; "Network Coding with Multi-Generation Mixing: Analysis and Applications for Video Communication;" IEEE International Conference on Communications; May 19, 2008; pp. 198-202.
Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.
Han, et al.; "On Network Coding for Security;" IEEE Military Communications Conference; Oct. 2007; pp. 1-6.
Hassner, et al.; "4K Bye-Sector HDD-Data Format Standard;" Windows Hardware and Driver Central; San Jose, CA; Aug. 14, 2013; 5 pages.
Ho, et al.; "A Random Linear Network Coding Approach to Multicast;" IEEE Transactions on Information Theory; vol. 52; No. 10; Oct. 2006, pp. 4413-4430.
Ho, et al.; "Byzantine Modification Detectiong in Multicast Networks using Randomized Network Coding;" IEEE; ISIT; Jun. 27-Jul. 2, 2004; p. 144.
Ho, et al.; "Network Coding from a Network Flow Perspective;" ISIT; Jun.-Jul. 2003; 6 pages.
Ho, et al.; "On Randomized Network Coding;" Proceedings of $41^{st}$ Annual Allerton Conference on Communications, Control and Computing; Oct. 2003; 10 pages.
Ho, et al.; "On the Utility of network coding in dynamic enviornments;" International Workshop on Wireless AD-HOC Networks (IWWAN); 2004; pp. 1-5.
Ho, et al.; "The Benefits of Coding over Routing in a Randomized Setting;" Proceedings of 2003 IEEE International Symposium on Information Theory; Jun. 2003; pp. 1-6.
Ho, et al.; "The Benefits of Coding over Routing in a Randomized Setting;" IEEE; ISIT Jun. 29-Jul. 4, 2003; p. 442.
Hofri; "Disk Scheduling: FCFS vs. SSTF Revisited;" Communications of the ACM; vol. 23; No. 11; Nov. 1980; pp. 645-653.

(56) References Cited

OTHER PUBLICATIONS

Hong, et al.; Network-coding-based hybrid ARQ scheme for mobile relay networks; Electronics Letters; vol. 46; No. 7; Apr. 1, 2010; 2 pages.

International Disk Drive Equipment and Materials Assoc.; "Advanced Standard;" in Windows Hardware Engineering Conf.; May 2005; 11 pages.

Iyer, et al.; "Anticipatory scheduling: A disk scheduling framework to overcome deceptive idelness in synchronous I/O;"SIGOPS Operating Sys. Review; vol. 35; No. 5; Dec. 2001; 14 pages.

Jacobson, et al.; "Disk scheduling algorithms based on rotational postion;" Hewlett-Packard laboratories; Palo Alto, CA; Technical Report HPL-CSP-91-7rev1; Feb. 26, 1991; 17 pages.

Jaggi, et al.; "Low Complexity Algebraic Multicast Network Codes;" Proceedings of the IEEE International Symposium on Information Theory; Jul. 4, 2003; 1 page.

Jaggi, et al.; "Resilent Network Coding in the Presence of Byzantine Adversaries;" Proc. IEEE INFOCOM; May 2007; 9 pages.

Jakubczak, et al.; "One-Size-Fits-All Wireless Video;" ACM SigComm Hotnets 2000; 6 pages.

Jamieson, et al.; "PPR: Partial Packet Recovery for Wireless Networks;" SIGCOMM 07; Aug. 27-31, 2007; 12 pages.

Jamieson, et al.; "PPR: Partial Packet Recovery for Wireless Networks;" Presentation; SIGCOMM 07; Aug. 27-31, 2007; 25 pages.

Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.

Ji, et al.; "A network coding based hybrid ARQ algorithm for wireless video broadcast;" Science China; Information Sciences; vol. 54; No. 6; Jun. 2011; pp. 1327-1332.

Jin, et al.; "Adaptive Random Network Coding in WiMAX;" Communications, 2008; ICC'08 IEEE Internationai Conference on May 19-23, 2008; 5 pages.

Jin, et al.; "Is Random Network Coding Helpful in WiMax," IEEE $27^{th}$ Conference on Computer Communicatons; Apr. 2008; 5 pages.

Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.

Karkpinski, et al.; "New Approximation Algorithms for the Steiner Tree Problems;" Technical Report, Electronic Colloquium on Computational Complexity (ECCC) TR95-030; 1995; pp. 1-17.

Karp, et al.; "Randomized Rumor Spreading;" IEEE Proceeding FOCS '00 Proceedings of the 41st Annual Symposium on Foundations of Computer Science; Jan. 2000; pp. 565-574.

Katti, et al.; "XORs in the Air: Practical Wireless Network Coding;" IEEE/ACM Transactions on Netowkring; vol. 16; No. 3; 2008; pp. 1-14.

Katti, et al.; "XORs in The Air: Practical Wireless Network Coding;" ACM SIGCOMM '06; Computer Communications Review; vol. 36; Sep. 11-15, 2006; 12 pages.

Kempe, et al.; "Protocals and Impossibility Results for Gossip-Based Communication Mechanisms;" Foundations of Computer Science, Jan. 2002; Proceedings. The $43^{rd}$ Annual IEEE Symposium; pp. 471-480.

Key, et al.; "Combining Multipath Routing and Congestion Control for Robustness;" In Proceedings of IEEE CISS, 2006, 6 pages.

Kim, et al.; "Modeling Network Coded TCP Throughout: A Simple Model and its Validation;"VALUETOOLS '11 Proceedings of the $5^{th}$ International ICST Conference on Performance Evaluation Methodologies and Tools; May 16-20, 2011; 10 pages.

Kim, et al.; "Modeling Network Coded TCP Throughput: A Simple Model and its Validation", Cornell University Library, http://arxiv.org/abs/1008.0420, Aug. 2010, 3 pages.

Kim, et al.; "Network Coding for Multi-Resolution Muiticast," IEEE INFOCOM 2010; Mar. 2010; 9 pages.

Kim, et al.; "Transform-free analysis of the GI/G/1/K queue through the decomposed Little's formula;" Computers and Operations Research; vol. 30; No, 3; Mar. 2003; pp. 1-20.

Kim, et al.; "Modeling Network Coded TCP Throughput: A Simple Model and its Validation", arXiv: 1008.0420v1 [cs.IT] Aug. 2, 2010; 9 pages.

Kim, et al.; "Modeling Network Coded TCP Throughput: A Simple Model and its Validation", Nov. 2010, Presentation; 19 pages.

Kodialam, et al.; "Online Muiticast Routing With Bandwidth Guarantees: A New Approach Using Multicast Network Flow;" IEEE/ACM Transactions on Networking; vol. 11; No. 4; Aug. 2003; pp. 676-686.

Koetter, et al.; "An Algebraic Approach to Network Coding;" IEEE/ACM Transactions on Networking; vol. 11, No. 5; Oct. 2003; pp. 782-795.

Koetter, et al.; "Beyond Routing: An Algebraic Approach to Network Coding;" IEEE Infocom; 2002; 9 pages.

Koutsonikolas, et al.; "Efficient Online WiFi Delivery of Layered-Coding Media using Inter-layer Network Coding;"Distributed Computing Systems (ICDCS); 2011 $31^{st}$ International Conference on Jun. 2011; 11 pages.

Kritzner, et al.; "Priority Based Packet Scheduling with Tunable Reliability for Wireless Streaming;" Lecture Notes in Computer Science; 2004; pp. 707-717.

Kuhn, et al.; "Distributed Computation in Dynamic Networks;" Proc. of the $42^{rd}$ Symposium on Theory of Computing (STOC); Jun. 5-8, 2010; 10 pages.

Lai; "Sequential Analysis: Some Classical Problems and New Challenges"; Statistica Sinica, vol. 11, No. 2; 2001; pp. 303-350.

Landau; "Application of the Volterra Series to the Analysis and Design of an Angle Track Loop;" IEEE Transactions on Aerospace and Electronic Systems; vol. AES-8, No. 3; May 1972; pp. 306-318.

Larsson, et al.; "Analysis of Network Coded HARQ for Multiple Unicast Flows;" Communication (ICC) 2010 IEEE International Conference on May 23-27, 2010 pp. 1-6.

Larsson, et al.; "Multi-User ARQ;" Vehicular Technology Conference; 2006; VTC (2006-Spring); IEEE $63^{rd}$; vol. 4; May 7-10, 2006; pp. 2052-2057.

Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388.

Larsson: "Multicast Muitiuser ARQ;" Wireless Communitations and Networking Conference (WCNC) 2008; IEEE; Apr. 3, 2008; pp. 1985-1990.

Le, et al.; "How Many Packets Can We Encode?—An Analysis of Pactical Wireless Network Coding;" INFOCOM 2008; The $27^{th}$ Conference on Computer Communications, IEEE; 2008; pp. 1040-1048.

Lee, et al.; "Content Distribution in VANETs using Network Coding: The Effect of Disk I/O and Processing O/H;" Proc. IEEE SECON; Jan. 2008; pp. 117-125.

Lehman, et al; "Complexity Classification of Network Information Flow Problems;" SODA 04' Proceedings of the fifteenth annual ACM-SIAM symposium on Discrete algorithms; Jan. 2004; pp. 9-10.

Li, et al.; "N-in-1 Retransmission with Network Coding;" IEEE Transactions on Wireless Communications; vol. 9; No. 9; Sep. 2010; pp. 2689-2694.

Li, et al.; "Robust and Flexible Scalable Video Muiticast with Network Coding over P2P Network;" $2^{nd}$ International Congress on Image and Signal Processing, IEEE Oct. 17, 2009; pp. 1-15.

Li,et al.; "Linear Network Coding;" IEEE Transactions on Information Theory; vol. 49; No. 2; Feb. 2003; pp. 371-381

Lima, et al.; "An Information-Theoretic Cryptanalysis of Network Coding—is Protecting the Code Enough;" International Symposium on Information Theory and its Applications; Dec. 2008.; 6 pages.

Lima, et al.; "Random Linear Network Coding: A free cipher?" IEEE International Symposium on Information Theory; Jun. 2007; pp. 1-5.

Lima et al., "Secure Network Coding for Multi-Resolution Wireless Video Streaming;" IEEE Journal on Selected Areas in Communications; vol. 28; No. 3; Apr. 2010; pp. 377-688.

Lima, et al; "Towards Secure Muitiresoiution Network Coding;" IEEE Information Theory Workshop; Jun. 12, 2009; pp. 125-129.

Liu, et al.; "The Throughput Order of Ad Hoc Networks Employing Network Coding and Broadcasting;" Military Communications Conference; MILCOM 2006; Oct. 2006; pp. 1-7.

(56) References Cited

OTHER PUBLICATIONS

Liu, et al.; "Using Layered Video to Provide Incentives in P2P Live Streaming;" PTP-TV07: Proceedings of the 2007 Workshop on Peer-to-peer Streaming and IP-TV; Aug. 31, 2007 ACM; 6 pages.

Luby, et al; "The Use of Forward Error Correction (FEC) in Reliable Multicast" Internet Society Request for Comments; RFC 3453; Dec. 2002; 18 pages.

Lucani et al.; "On Coding for Delay New Approaches based on Network Coding in Network Coding in Networks with Large Latency;" Presentation in NetCod; Slide Pesentation; Jun. 16, 2009; 17 pages.

Lucani et al; "Broadcasting in Time-Division Duplexing: A Random Linear Network Coding Approach;" presentd Switzerland: Conference: NetCod 2009, Lausanne, Switzerland; Jun. 2009; 6 pages.

Luciani et al.; "On Coding for Delay—New Approaches Based on Network Coding in Networks with Large Latency;" Conference: ITA Workshop, San Diego, USA; Feb. 2009; 10 pages.

Lucani et al; "On Coding for Delay New Approaches based on Network Coding in Networks with Large Latency:" Conference ITA Workshop, San Diego USA; Slide Presentation; Feb. 13, 2009; 11 pages.

Lucani et al; "Random Linear Network Coding for Time Division Duplexing: Energy Analysis;" Conference: ICC 2009, Dresden, Germany; Jun. 16, 2009; 5 pages.

Lucani et al.; "Random Linear Network Coding for Time-Division Duplexing: when to stop talking and start listening;" Presentation in ICC; Slide Presentation; Jun. 16, 2009; 6 pages.

Lucani et al; "Random Linear Network Coding for Time-Division Duplexing: when to stop talking and start listening;" Presentation in INFOCOM; Slide Presentation; Apr. 23, 2009, 10 pages.

Lucani et al; "Random Linear Network Coding for Time-Division Duplexing: Queueing Analysis;" Conference ISIT 2009, Seoul, Korea: Jul. 2009; 5 pages.

Lucani et al.; "Random Linear Network Coding For Time-Division Duplexing: Filed Size Considerations;" Conference: GLOBECOM 2009, Hawaii, USA; Dec. 2009; 6 pages.

Lucani, et al.; "Network Coding For Data Dissemination: It is Not What You Know, But What Your Neighbors Don't Know;" Modeling and Optimization in Mobile, AdHoc, and Wireless Networks 2009; WIOPT 2009; 7th International Symposium on Jun. 23-27, 2009; pp. 1-8.

Lucani, et al.; "Network Coding Schemes for Underwater Networks;" WUWNet 07; Sep. 14, 2007; pp. 25-32.

Lucani, et al.; Systematic Network Coding for Time-Division Duplexing; Proceedings of the IEEE International Symposium on Information Theory (ISIT): ; Jun. 13-18, 2010; pp. 2403-2407.

Lun, et al.; "Further Results on Coding for Reliabie Communication over Packet Networks;" Information Theory, ISIT 2005 Proceedings International Symposium on Sep. 4-9, 2005; 5 pages.

Lun, et al.; "On Coding for Reliable Communication Over Packet Networks;" Physical Communication; vol. 1; No. 1; Jan. 2008; pp. 10 pages.

Lun, et al.; "On Coding for Reliable Communication over Packet Networks;" LIDS Publication #2741; Jan. 2007; 33 pages.

Lun, et al.; An Analysis of Finite-Memory Random Linear Coding on, Packet Streams; Modeling and Optimization in Mobile, Ad Hoc and Wireless Networks Apr. 3-6, 2006; pp. 1-6.

Lun: "Efficient Operation of Coded Packet Networks;" Ph.D. Dissertation; Massachusetts Institute of Technology; Jun. 2006; 130 pages.

Magli, et al.; "An Overview of Network Coding for Multimedia Streaming;" IEEE International Conference; Jun. 28, 2009; pp. 1488-1491.

Mallat, et al.; "Adaptive Covariance Estimation of Locally Stationary Processes;" Annals of Statistics, vol. 26, No. 1; 1998; pp. 1-43.

Manssour, et al.; "A Unicast Retransmission Scheme based on Network Coding;" IEEE Transactions on Vehicular Technology; vol. 61; Issue 2; Nov. 2011; 7 pages.

Maymounkov, et al.; "Methods for Efficient Network Coding;" Proc. of the 44th Allerton Conference on Communication: Control, and Computing; Sep. 2006; 10 pages.

Médard, et al.; "On Coding for Non-Multicast Networks;" invited paper, 41st Allerton Annual Conference on Communication, Control; Outgrowth of supervised student research Publications of Muriel Médard and Computing; vol. 1; Oct. 2003; 9 pages.

Medard; "Some New Directions for Network Coding in Content Distribution", RLE, EECS, MIT, Seminar to Alcatel Lucent, Nov. 2010, 29 pages.

Merchant, et al.; "Analytic Modeling of Clustered RAID with Mapping Based on Nearly Random Permutation;" IEEE Transactions on Computers; vol. 45; No. 3; Mar. 1996; pp. 367-373.

Metzner; "An Improved Broadcast Retransmission Protocol;" IEEE Transactions on Communications; vol. COM-32; No. 6; Jun. 1984; pp. 679-683.

Mosk-Aoyama, et al.; "Information Dissemination via Network Coding;" ISIT 2006; IEEE; Jul. 9-14, 2006; pp. 1748-1752.

Moyer, et al.; "A Survey of Security issues in Multicast Communications;" IEEE Network; vol. 13; No. 6;.Nov./Dec. 1999; pp. 12-23.

Nguyen, et al.; "Internet Media Streaming Using Network Coding and Path Diversity;" IEEE Global Telecommunications Conference; Nov. 30-Dec. 4, 2008; 5 pages.

Nguyen, et al.; "Wireless Broadcast Using Network Coding;" Vehicular Technology IEEE Transactions on Feb. 2009; vol. 58; Issue 2; 25 pages.

Nguyen, et al; "Video Streaming with Network Coding;" Journal of Signal Processing Systems; vol. 59, Issue 3; DOI: 10.1007/s11285-009-0342-7; Jun. 2010; 25 pages.

Nobel; "Hypothesis Testing for Families of Ergodic Processes;" Bernoulli-London, vol. 12, No. 2; 2006; 21 pages.

Noguichi, et al.; "Performance Evaluation of New Multicast Architecture with Network Coding;" IEICE Transactions on Communication, E86-B; No. 6: Jun. 2003; 3 pages.

NS Version 1—LBNL Network Simulator; web page—http://ee.lel.gov/ns/; Mar. 21, 2011; 3 pages.

Nyandoro, et al.; "Service Differentiation in Wireless LANs based on Capture;" IEEE GLOBECOM 2005; vol. 6; Dec. 2005; 5 pages.

Oliveira, et al.; "A Network Coding Approach to Secret Key Distribution;" IEEE Transactions on Information Forensics and Security; vol. 3; No. 3; pp. 414-423; Sep. 2008.

ParandehGheibi, et al.; "Access-Network Association Policies for Media Streaming in Heterogeneous Environments;" Apr. 2010; pp. 1-8.

Peng, et al.; "Research on Network Coding based Hybrid-ARQ Scheme for Wireless Networks;"Communication Systems (ICCS); 2010 IEEE International Conference on Nov. 17-19, 2010; pp. 218-222.

Popovici, et al.; "Robust, Portable I/O Scheduling with the Disk Mimic;" Proc. USENIX Annual Tech. Conf. San Antonio, Texas, Jun. 2003; 14 pages.

Qureshi, et al.; "An Efficient Network Coding based Retransmission Algorithm for Wireless Multicast;" Personal, Indoor and Mobile Radio Communications, 2009 IEEE 2th International Symposium on Sep. 13-16, 2009; 5 pages.

Radunovic, et al.; "Horizon: Balancing TCP Over Multiple Paths in Wireless Mesh Network;" Proc. 14th ACM Internationai Conference on Mobile Computing and Networking; Sep. 2008; 12 pages.

Ramanathan; "Multicast Tree Generation in Networks with Asymmetric Links;" IEEE Transactions on Networking; vol. 4; Aug. 1996; pp. 1-12.

Rezaee, et al.; "Multi Packet Reception and Network Coding;" Presentation at The 2010 Military Communications Conference Unclassified Technical Program; Nov. 2, 2010; 15 pages.

Rezaee, et al.; "An Analysis of Speeding Multicast by Acknowledgment Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.

Rezaee, et al.; "Speeding Multicast by Acknowledgment Reduction Technique (SMART);" ArXiv:1104.2941v2 [cs.NI] Sep. 10, 2011; 6 pages.

(56) References Cited

OTHER PUBLICATIONS

Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.

Rezaee, et al.; "Multi Packet Reception and Network Coding;" Military Communications Conference; 2010; MILCOM 2010; IEEE; Oct. 31, 2010-Nov. 3, 2010; pp. 1393-1398.

Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.

Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; pp. 374-379.

Roughgarden, et al.; "How Bad is Selfish Routing?" Journal of the ACM; vol. 49, No. 2; Mar. 2002; pp. 236-259.

Ruemmler, et al.; "An introduction to disk drive modeling;" IEEE Computers; vol. 27; No. 3; Mar. 17-29, 1994; 17 pages.

Ryabko, et al.; "On Hypotheses Testing for Ergodic Processes;" Information Theory Workshop; ITW'08; IEEE; 2008; pp. 281-283.

Sanders, et al.; "Polynomial Time Algorithms for Network Information Flow;" 15$^{th}$ ACM Symposium on Parallel Algorithms and Architectures; Jun. 2003; pp. 1-9.

Sayenko, et al.; "Performance Analysis of the IEEE 802.16 ARQ Mechanism;" MSWIM'07; Oct. 22-26, 2007; pp. 314-322.

Scharf; "MPTCP Application Interface Considerations draft-scharf-mptcp-ap-04;" Internet Engineering Task Force; Internet-Draft; Nov. 22, 2010; 26 pages.

Seharogiu, et al.; "Opportunistic Network Coding for Video Strearning over Wireless;" Packet Video; Nov. 2007; 10 pages.

Sengupta, et al.; "An Analysis of Wireless Network Coding for Unicast Sessions: The Case for Coding-Aware Routing;" in INFOCOM 2007: 26$^{th}$ IEEE International Conference on Computer Communications; Jun. 2007; 9 pages.

Servetto, et al.; "Constrainred Random Walks on Random Graphs: Routing Algorithms for Large Scale Wireless Sensor Networks;" WSNA 02; Sep. 28, 2002; 10 pages.

Shenker, et al.; "Pricing in computer networks: reshaping the research agenda:" Telecommunications Policy; vol. 20, No. 3; Jan. 1996: pp. 183-201.

Sherali, et al.; "Recovery of primal solutions when using subgradient optimization methods to solve Lagrangian duals of linear programs;" Elsevier Operations Research Letters 19 (Jan. 1996); pp. 105-113.

Shields; "The Interactions Between Ergodic Theory and Information Theory;" IEEE Transactions on Information Theory, vol. 44, No. 6; Oct. 1998; pp. 2079-2093.

Shrader, et al.; "Systematic wireless coding;" Military Conference, 2009; MILCOM 2009; IEEE; 7 pages.

Shrader, et al; "Routing and Rate Control for Coded Cooperation in a Satelite-Terrestrial Network;" IEEE: The 2011 Military Communications Conference—Track 2—Network Protocols and Performance; Nov. 7-10, 2011; pp. 735-740.

Shriver, et al.; "An analytical behavior model for disk drives with readahead caches and request reordering;" Proc. SIGMETRICS/Performance, Joint Conf. on Meas. and Modeling Comp. Sys.; ACM; Jan. 1998; 10 pages.

Song, et al.; "Zero-Error Network Coding for Acyclic Networks;" IEEE Transactions on Information Theory; vol. 49, No. 12; Dec. 2003; pp. 3129-3139.

SongPu, et al.; Performance analysis of joint chase combining and network coding in wireless broadcast retransmission: Wireless Communication Network and Mobile Computing 2008; WiCOM '08, 4$^{th}$ International Conference on Oct. 12-14, 2008; pp. 1-4.

Soo Suh; "Send-On-Delta Sensor Data Transmission With a Linear Predictor;" Sensors; ISSN 1424-8220; vol. 7; No. 4; Apr. 26, 2007; pp. 537-547.

Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.

Sundaram, et al.; "Multirate Media Streaming Using Network Coding;" Proc. 43$^{rd}$ Allerton Conference on Communication, Control, and Computing; Sep. 2005; 7 pages.

Sundararjan, et al.; "ARQ for Network Coding;" ISIT Proc. of the IEEE International Symposium on Information Theory (ISIT); Jul. 6-11, 2008; pp. 1651-1655.

Sundararajan, et al.; "Network Coding Meets TCP: Theory and Implementation;" Proceedings of the IEEE; vol. 99, Issue 3; Mar. 2011; pp. 490-512.

Sundararajan, et al.; "Network coding meets TCP;" InfoCOM 2009; IEEE, Apr. 19-25; 2009; pp. 280-288.

Sundararajan, et al.; On Queueing in Coded Networks—Queue Size Follows Degrees of Freedom; IEEE Information Theory Workshop on Information Theory for Wireless Networks (ITW); Jul. 6, 2007; 6 pages.

Teerapittayanon, et al.; "Network Coding aa a WiMAX Link Reliability Mechanism;" Multiple Access Communication; Lectures Notes in Computer Science; vol. 7642; pp. 1-12; 2012.

Teerapittayanon, et al.; "Performance Enhancements in Next Generation Wireless Networks Using Network Coding: A Case Study in WiMAX;" Massachusetts Institute of Technology; Jun. 2012; 130 pages.

Thobaben; "Joint Network/Channel Coding for Multi-User Hybrid-ARQ;" Source and Channel Coding (SCC) 2008; 7$^{th}$ International ITG Conference on Jan. 14-16, 2008; 6 pages.

Tosun, et al.; "Efficient Multi-Layer Coding and Encryption of MPEG Video Streams;" Proc. 2000 IEEE International Conference on Multimedia and Expo; vol. 1: 2000; pp. 119-122.

Tosun, et al.; "Lightweight Security Mechanisms for Wireless Video Transmission;" Proc. Intl. Conference on Information Technology, Coding and Computing; Apr. 2001; pp. 157-161.

Tran, et al.; "A Hybrid Network Coding Technique for Single-Hop Wireless Networks;" IEEE Journal on Selected Areas in Communications; vol. 27; No. 5; Jun. 2009; pp. 658-698

Tran; et al.; "A joint Network Channel Coding Technique for Single-Hop Wireless Netwerks;" Network Coding, Theory and Applications; 2008; NetCod 2008; Fourth Workshop, on Jan. 3-4, 2008; pp. 1-6.

Trung; et al.; "Quality Enhancement for Motion JPEG Using Temporal Redundancies," IEEE Transactions on Circuits and System for Video Technology, vol. 18; No. 5; May 2008; pp. 609-619.

Tsatsanis, et al., "Network Assisted Diversity for Random Access Wireless Data Networks;" Signals, Systems & amp; Computers; IEEE; vol. 1; Nov. 1-4, 1988; pp. 83-87.

Valancius, et al.; "Greening the Internet with Nano Data Centers;" Proc. 5$^{th}$ International Conference on Emerging Networking Expierements and Technologies; CoNEXT 2009; ACM 2009; Dec. 1-4, 2009; pp. 37-48.

Vasudevan, et al.; "Algebraic Gossip on Arbitray Networks;" arXiv:0901.1444; Jan. 2009; 5 pages.

Velambi, et al.; "Throughput and Latency in Finite-Buffer Line Networks;" IEEE Transactions on Information Theory; vol. 57; No. 6; Jun. 2011: pp. 3622-3643.

Vien, al.; "Network Coding-based Block ACK for Wireless Relay Networks;" Proceedings of IEEE Vehicular Technology Conference (VTC2011-Spring); May 2011; 5 pages.

Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.

Vilela, et al.; "Lightweight Security for Network Coding;" IEEE International Conference on Communications; May 2008; 5 pages.

Wang, et al.; "Capacity-Delay Tradeoff for Information Dissemination Modalities in Wireless Networks;" in Information Theory; ISIT 2008; IEEE International Symposium; Jul. 2008; pp. 677-681.

Wang, et al.; "Embracing Interference in Ad Hoc Networks Using Joing Routing and Scheduling with Multiple Packet Reception;" in INFOCOM 2008; The 27$^{th}$ Conference on Computer Communcations; IEEE; Apr. 2008; pp. 1517-1525.

(56) References Cited

OTHER PUBLICATIONS

Wang, et al.; Multipath Live Streaming via TCP: Scheme, Performance and Benefits; ACM Transactions on Multimedia Computing, Communications and Applications; vol. 5; No. 3. Article 25; Aug. 2009; pp. 1-23.

Widmer, et al.; "Network Coding for Efficient Communication in Extreme Networks;" Applications, Technologies, Architectures, and Protocols for Computer Communications; Aug. 2005; pp. 284-291.

Wieselthier, et al.; "Energy Efficient Broadcast and Multicast Trees in Wireless Networks;" Mobile Networks and Applications 7; Jan. 2002; pp. 481-492.

Wiesetheier, et al.; "Energy-Aware Wireless Networking with Directional Antennas: The Case of Session-Based Broadcasting and Milticasting;" IEEE Transactions on Mobile Computing; vol. 1, No. 3; Jul.-Sep. 2002; pp. 176-191.

Wilhelm; "An Anomaly in Disk Scheduling: A Comparison of FCFS and SSTF Seek Scheduling Using an Empirical Model for Disk Access;" Communcations of the ACM, vol. 19; No. 1; Jan. 1976; pp. 13-17.

Wu, et al.; "A Trellis Connectivity Analysis of Random Linear Network Coding with Buffering;" Proc. of the International Symposium on Information Theory (ISIT); Jul. 9-14, 2006; pp. 768-772.

Yazdi, et al.; "Optimum Network Coding for Delat Sensitive Applications in WiMAX Unicast;" IEEE INFOCOM 2009; Apr. 19-25, 2009; pp. 4576-2580.

Yeung; "Multilevel Diversity Coding with Distortion;" IEEE Transactions on Information Theory; vol. 41, No. 2; Mar. 1995; pp. 412-422.

Yong, et al.; "XOR Retransmission in Multicast Error Recovery;" Networks 2000; ICON; Proceedings IEEE International Conference on Sep. 5-8, 2000; pp. 336-340.

Yun, et al.; "High-Throughput Random Access Using Successive Interface Cancellation in a Tree Algorithm;" IEEE Transactions on Information Theory; vol. 53; No. 12; Dec. 2007; pp. 4628-4639.

Yun, et al.; Towards Zero Retransmission Overhard: A Symbol Level Network Coding Approach to Retransmission; IEEE Transactions on Mobile Computing: vol. 10; No. 8; Aug. 2011; pp. 1083-1095.

Zeger, "Packet Erasure Coding with Random Access to Reduce Losses of Delay Sensitive Multislot Messages;" IEEE; Paper ID #900482; Aug. 18, 2009; pp. 1-8.

Zhang, et al.; "Collision Resolution in Packet Radio Networks Using Rotational Invariance Techniques;" IEEE Transactiong on Communication; vol. 50; No. 1; Jan. 2002; pp. 146-155.

Zhang, et al.; "Optimized Multipath Network Coding in Loss Wireless Networks;" ICDCS '08 Proceedings of the 2008 The $28^{th}$ International Conference on Distributing Computing Systems; Jan. 2008; 12 pages.

Zhang, et al.; Dual XOR in the AIR: A Network Coding Based Retransmission Scheme for Wireless Broadcasting; Communications (ICC) 2011 IEEE International Conference on Jun. 5-9, 2011; pp. 1-6.

Zhao, et al.; "Multiqueue Service Room MAC Protocol for Wireless Networks With Multipacket Reception;" IEEE/ACM Transactions on Networking; vol. 11; No. 1; Feb. 2003; pp. 125-137.

Zhao, et al.; "On analyzing and improving COPE performance;" Information Theory and Applications Workshop (ITA), Jan. 2010; pp. 1-6.

Zhu, et al.; "Multicast with Network Coding in Application-Layer Networks;" IEEE Journal on Selected Areas in Communications; vol. 22; No. 1; Jan. 2004; pp. 1-13.

U.S. Appl. No. 13/654,953, filed Oct. 18, 2012, Zeger, et al.
U.S. Appl. No. 13/655,034, filed Oct. 18, 2012, Medard, et al.
U.S. Appl. No. 13/890,604, filed May 9, 2013, Zeger, et al.
U.S. Appl. No. 14/208,683, filed Mar. 13, 2014, Calmon, et al.
U.S. Appl. No. 14/297,090, filed Jun. 5, 2014, Kim, et al.
U.S. Appl. No. 14/678,359, filed Apr. 3, 2015, Zeger, et al.
U.S. Appl. No. 14/668,185, filed Mar. 25, 2015, Medard, et al.
U.S. Appl. No. 14/882,115, filed Aug. 10, 2015, Lima, et al.
U.S. Appl. No. 14/843,358, filed Sep. 2, 2015, Haupler, et al.
U.S. Appl. No. 14/826,256, filed Aug. 14, 2015, Zeger, et al.
International Preliminary Report on Patentability of the ISA for PCT/US2014/024386 dated Sep. 15, 2015.

\* cited by examiner

METHOD AND APPARATUS FOR IMPLEMENTING DISTRIBUTED CONTENT CACHING IN A CONTENT DELIVERY NETWORK

CROSS REFERENCE TO RELATED APPLICATION

The present application claims the benefit of U.S. Provisional Patent Application No. 61/783,666 filed on Mar. 14, 2013, which is hereby incorporated by reference herein in its entirety.

FIELD

Subject matter disclosed herein relates generally to data distribution and, more particularly, to digital content distribution from one or more content providers to a plurality of end users.

BACKGROUND

Content delivery networks (CDN) are systems that are used to distribute digital content to end users in a network. CDNs are often used by content providers to distribute their content to the public. The content providers may maintain their own CDNs or they can pay an independent CDN operator to distribute their content. Usually, a CDN will agree to deliver content to users with a certain quality of service (QoS). A CDN will typically operate one or more data centers to support content delivery. As is well known, a data center is a large facility that typically houses a vast array of computer hardware (e.g., servers, routers, disk drives, etc.) involved in the storage and delivery of digital content to users. The CDN may own the data center(s) or it may contract with one or more independent data centers to facilitate the content distribution.

As will be appreciated, CDNs can be very expensive and complicated to operate. In addition, with the ever increasing demand for digital content, CDN's are being called upon to maintain or support larger and more numerous data centers to meet demand and satisfy their quality of service obligations. There is a need for techniques, systems, and devices that can be used to reduce the costs and hardware requirements associated with digital content delivery.

SUMMARY

In various embodiments described herein, techniques and systems are provided for enhancing the performance and design of content delivery networks (CDNs) using distributed content caching (DCC). Some of the features described herein can be used to, for example, enhance the efficiency of operation of CDNs and reduce the cost of implementing such systems. In some embodiments, optimization techniques are provided for optimizing DCC performance in a CDN. Network coding techniques (or other coding techniques) are also provided in some implementations to store content in a CDN to permit, for example, seamless distribution of files across different gateways or edge devices in the network. The use of network coding may allow some problems associated with individual file partitioning to be circumvented, thus allowing files to be seamlessly distributed over the network without having to be concerned with the specific location of different parts of a given file.

In accordance with one aspect of the concepts, systems, circuits, and techniques described herein, a machine implemented method is provided for use in a content delivery network (CDN) that distributes content to a plurality of users. The CDN uses a central server to manage content delivery services and a plurality of gateway devices located proximate to user locations that have data storage capability to cache at least some of the content to be distributed by the CDN. More specifically, the method comprises: collecting information describing the CDN; assembling statistics of operation of the CDN corresponding to user content requirements; determining content to be stored at the plurality of gateway devices by minimizing a cost function associated with content delivery, wherein the cost function accounts for costs associated with content delivery from the server and costs associated with content delivery from the gateway devices, wherein determining content includes using the collected information and the assembled statistics; and sending content to the plurality of gateway devices to be cached thereby in accordance with the results of determining content to be stored.

In one embodiment, collecting, assembling, determining, and sending are performed at the central server.

In one embodiment, the method further comprises continually repeating collecting, assembling, determining, and sending to operate the CDN in an efficient manner.

In one embodiment, the cost function includes a term to account for delivery delays of the server.

In one embodiment, the cost function Includes a constraint on server load variance.

In one embodiment, determining content to be stored at the plurality of gateway devices includes using at least one of the following optimization procedures to minimize the cost function: the General Proxy Gradient Scheme, the interior point method, and numerical solvers such as GUROBI and CVX.

In one embodiment, sending content to the plurality of gateway devices to be cached thereby includes sending the content via the Internet.

In one embodiment, the plurality of gateway devices associated with the CDN communicate with the Internet through a common Internet Service Provider (ISP), wherein the central server is connected to the Internet.

In one embodiment, sending content to the plurality of gateway devices includes causing at least some of the content to be sent to the gateway devices from one or more data centers that are not located at the central server location.

In one embodiment, sending content to the plurality of gateway devices to be cached thereby includes sending network coded file segments to gateway devices.

In accordance with another aspect of the concepts, systems, circuits, and techniques described herein, a content delivery network (CDN) to provide content delivery services for a plurality of users comprises a content delivery server to manage content delivery services for the CDN, the content delivery server being configured to develop a caching scheme for the CDN for caching selected content at a plurality of gateway devices deployed at or near user locations, the caching scheme to enhance the efficiency with which content is delivered to users, wherein the content delivery server is configured to develop the caching scheme by minimizing a cost function associated with content delivery, the cost function taking into account both costs associated with content delivery from the gateway devices and costs associated with content delivery from one or more other content storage locations of the CDN.

In one embodiment, the plurality of gateway devices deployed at or near the user locations are under the control of the CDN.

In one embodiment, the content delivery server is configured to deliver content to individual gateway devices in the plurality of gateway devices in accordance with the caching scheme.

In one embodiment, the content delivery server is configured to occasionally update the caching scheme to account for changes in the CDN over time.

In one embodiment, the content delivery server is coupled to the plurality of gateway devices through the Internet.

In one embodiment, the plurality of gateway devices are all associated with a common Internet service provider (ISP).

In one embodiment, the content delivery server is configured to: collect information about a present configuration of the CDN; assemble statistics of operation of the CDN corresponding to user content requirements; and use the collected information and the assembled statistics to develop the caching scheme for the CDN.

In one embodiment, the cost function uses a cost for the content delivery server to transmit a unit of content to a gateway and a cost of caching a unit of content at a gateway.

In one embodiment, the cost function includes a term to account for delivery delays at the server.

In one embodiment, the cost function includes a constraint on server load variance.

In one embodiment, the content delivery server is configured to deliver network coded content to the plurality of gateway devices to be cached therein.

In accordance with still another aspect of the concepts, systems, circuits, and techniques described herein, an article is provided that comprises one or more non-transitory computer readable media having instructions stored thereon that, when executed by a computing system, performs a method for use in a content delivery network (CDN) that distributes content to a plurality of users. The CDN may include a central server to manage content delivery services and a plurality of gateway devices located proximate to user locations that have data storage capability for use in caching at least some of the content to be distributed in the CDN. More specifically, the method may comprise: collecting information describing the CDN; assembling statistics of operation of the CDN corresponding to user content requirements; determining content to be stored at the plurality of gateway devices by minimizing a cost function associated with content delivery, wherein the cost function accounts for costs associated with content delivery from the server and costs associated with content delivery from the gateway devices, wherein determining content includes using the collected information and the assembled statistics; and sending content to the plurality of gateway devices to be cached thereby in accordance with the results of determining content to be stored.

In one embodiment, the cost function includes a term to account for delivery delays at the server.

In one embodiment, the cost function includes a constraint on server load variance.

BRIEF DESCRIPTION OF THE DRAWINGS

The foregoing features may be more fully understood from the following description of the drawings in which.

DETAILED DESCRIPTION

Figure 1:
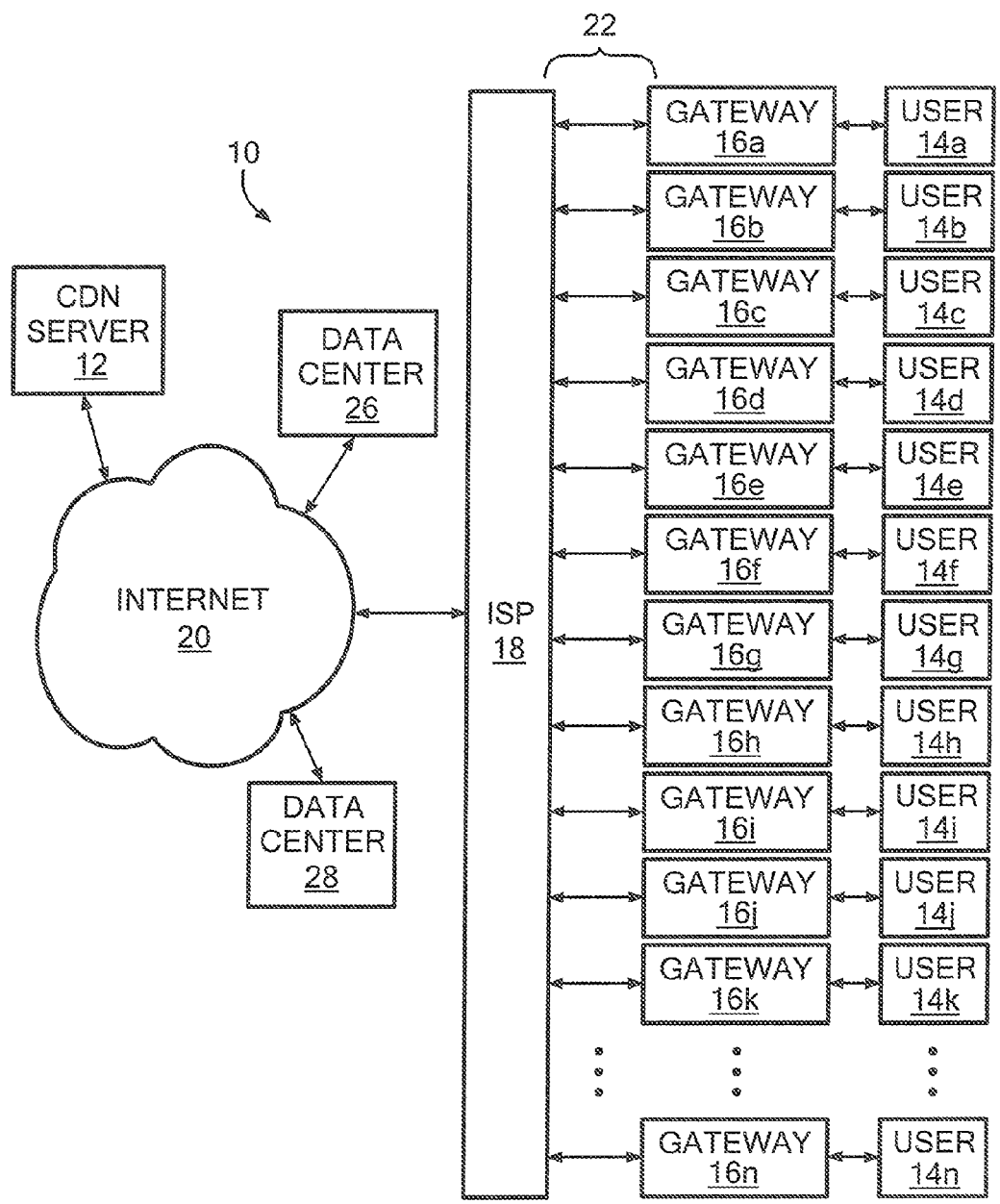
FIG. 1 is a block diagram illustrating a content delivery network (CDN) in accordance with an embodiment.

Techniques, systems, and devices are described herein that allow digital content to be distributed to users within networks in an efficient and cost effective manner. These techniques, systems, and devices may be used by content providers, content delivery network (CDN) operators, and data center operators to, for example, reduce the cost, complexity, and hardware requirements associated with content delivery. In various embodiments, distributed content caching (DCC) techniques are used to reduce hardware requirements within data centers associated with a CDN. As will be described in greater detail, DCC involves storing some or all of the content to be distributed near the end points of the network (i.e., near the user locations) instead of at one or more centralized locations (e.g., a data center, etc.). Thus, in some embodiments described herein, content is stored within edge devices or gateways associated with users of a network that are located at or near the user locations. In addition, in various embodiments, techniques are provided for intelligently selecting the content that will be cached within the gateway devices of the network to achieve efficient content distribution, given the cost of storage and communication constraints within the network. The techniques, systems, and devices described herein may be used to deliver content in different types of networks, including both large and small networks and both private and public networks.

In some embodiments, one or more cost functions are provided for use in improving the efficiency of operation of DCC. Optimization techniques may be utilized to minimize the cost functions to find values for a number of decision variables associated with the system. The decision variable values may then be used to select the content to be stored within the user gateways of the network. In some embodiments, network coding is used to encode the content to be stored at the edge locations. Using this approach, problems associated with partitioning and sequencing of portions of a content file (e.g., separate portions of a video movie file, etc.) may be avoided. Using network coding techniques, a content file may be separated into numerous coded segments that do not require sequence numbers to be reassembled into a useable file. Instead, an end user must merely collect a sufficient number of such coded segments from different source locations to allow decoding to occur. The actual sources of the coded segments will not matter as long as a sufficient number of linearly independent coded segments are received to permit decoding.

As described previously, CDNs typically use data centers to facilitate the delivery of content to end users. Data centers are large facilities that centralize much of the equipment required for effective content delivery. This centralization of equipment allows overall costs to be reduced, including both maintenance and communication costs. However, such centralization also has problems associated with it. These problems may include problems associated with over-provisioning, energy dissipation, and distance to end-user. Any company that provides online services, regardless of size, has to consider the costs associated with data centers as a critical component of its business model.

Over-provisioning is related to the fact that most data centers are designed to match peak-demand instead of average demand, greatly increasing the number of servers required. Due to their physical architectures (e.g., a large number of concurrently operating processors, etc.), data centers can generate a large amount of unwanted heat that needs to be removed to ensure continued operation. Removal of this heat can sometimes be a challenge. Data centers are also typically far removed from the user locations in the network. These large distances can require increased bandwidth provisioning for communication, and can also present a problem for applications with stringent delay constraints, such as video streaming.

The use of distributed content caching (DCC) is one way to reduce or eliminate some of the problems associated with data centers when performing digital content distribution. As described above, DCC involves storing some or all of the content to be distributed to users at edge or gateway devices located at or near the user locations. With the price of storage always decreasing, gateways can be equipped with large amounts of digital storage for use in storing digital content. These devices may also be equipped with some level of digital computational power that can be used to support content caching in some embodiments. In addition, such devices are typically connected to the Internet (or another network) through broadband links, thus giving the devices the ability to act as small scale servers for content distribution. In some systems, gateway devices associated with different users are able to directly communicate with one another, or communicate with one another through a corresponding ISP, in a relatively low cost manner. In some embodiments, this low cost communication capability may be taken advantage of when implementing DCC in an CDN, with gateways serving other gateways in a peer-to-peer fashion.

To illustrate the above-described idea, consider the challenge faced by a cable company that wishes to provide high resolution, on-demand video services to users. On the one hand, the cable company can use its CDN to distribute content to users at a certain cost, which will depend on the amount of resources demanded (e.g., traffic volume, data center costs, etc). As an alternative, the cable company can leverage the memory and connectivity of the thousands of gateways on its network to offload at least some of the CDN functionality. If the gateways are used in this manner, the cable company will have to determine how to distribute the content files across the different gateways given, for example, the cost of storage, the communication constraints of the network, and the reliability of the network. As described previously, techniques, systems, and devices are described herein that can be used to determine how to distribute the content amongst the gateway devices in an efficient, cost effective manner.

FIG. 1 is a block diagram illustrating a content delivery network (CDN) 10 in accordance with an embodiment. As illustrated, the CDN 10 includes a content delivery server 12 that is used to manage the delivery of digital content to a plurality of users 14a-14n via the Internet 20 or another network. The digital content may include any type of content that can be delivered to end users in response to requests including, for example, video files, audio files, software downloads, streaming media, data files, text files, news content, video games, on-line games, and/or others. In the discussion that follows, various content delivery techniques and systems will be described in the context of video files, such as movies delivered as part of a movies on demand type application. It should be understood, however, that the described techniques and systems may be used with other types of digital content in other implementations.

As shown in FIG. 1, each of the users 14a-14n associated with the CDN 10 is coupled to a corresponding gateway device 16a-16n which serves as an entry point into the larger network (e.g., the Internet 20). The gateway devices 16a-16n may each include any type of device that allows a user to connect to a larger network. For example, a gateway device may include: a set top box, a residential gateway, a WiMax gateway, a cellular gateway, a cable modem, a DSL modem, a pico-cell associated with a cellular communication system, a router, a game console, or any other device that has storage and sufficient computing power to support the desired application (such as a desktop or laptop computer). In some embodiments, one or more of the gateway devices 16a-16n may also provide some level of protocol or signal formatting conversion between disparate networks, but this is not required. In addition, in some embodiments, different types of gateway devices 16a-16n may be used by different users 14a-14n. In some embodiments, the gateway devices 16a-16n may be equipment that is provided to the users by an ISP, a content provider, or a CDN operator, although gateway devices 16a-16n that are user owned and/or user controlled may also be used.

In the illustrated embodiment, all of the users 14a-14n associated with the CDN 10 connect to the Internet 20 through a common Internet Service Provider (ISP) 18. As will be described in greater detail, by limiting the CDN 10 to users that share an ISP, relatively low cost communication between gateway devices 16a-16n may be assumed. In some embodiments, however, users that communicate with the Internet (or another network) via multiple different providers may be present within a CDN. With reference to FIG. 1, the gateway devices 16a-16n are coupled to the ISP 18 via a plurality of communication links 22. These links 22 may include wireless and/or wired links. In some embodiments, user gateways may connect directly to a larger network without the need for an intervening service provider (i.e., an ISP, etc.).

The users 14a-14n shown in FIG. 1 may each have user equipment associated with them that allow the user to request, receive, and utilize the digital content that is being delivered to them. The user equipment may include, for example, a computer, a television set, a media player, an audio device, and/or others. In a video streaming application, for example, user equipment that is capable of playing streaming video files may be used. Many other types of user equipment may additionally or alternatively be used. In some implementations, the user equipment associated with a user may include, for example, local networking equipment. For example, one or more of the users 14a-14n may maintain a local area network (LAN) within a corresponding residence or office building. A router or wireless access point (WAP) associated with the LAN may be connected to a corresponding gateway device to connect the LAN to the Internet. As will be appreciated, such a LAN may allow multiple users to share a gateway device.

In some embodiments, the users 14a-14n may each represent users at fixed user locations, such as within corresponding buildings, residences, or other stationary structures. In other implementations, some or all of the users 14a-14n may be mobile users having mobile user equipment. In these implementations, the gateways that include the local storage for caching content may include, for example, a wireless base station (e.g., a cellular base station in a cellular system, a WiMax base station in a WiMax network, etc.) that provides access to a network for the mobile users. In some other implementations, a wireless base station may act as a central server and the mobile devices themselves may act as the local gateways that store the content locally.

The CDN server 12 may be operative for, among other things, receiving and processing requests from users for digital content. Thus, the CDN server 12 may receive a request from, for example, user 14h for delivery of a particular movie. The CDN server 12 may then determine where the requested movie is stored within the CDN 10 and cause the movie to be delivered from that location to the requesting user. In other implementations, the gateways 16a-16n themselves may receive some or all of the requests from users, determine the locations of the requested movie within the nearby gateway devices, and facilitate the delivery of the requested movie file to the requesting user. In some embodiments, a single requested file may be divided amongst multiple different storage locations within the CDN 10. In this case, the CDN server 12 and/or gateway may cause all of the different portions of the file to be delivered to the user. In an implementation where network coding is used to store digital content, coded file segments corresponding to a particular file may be stored in numerous places within the CDN 10. In this scenario, the CDN server 12 or gateway may cause coded packets to be delivered to the requesting user from various different sources. In some implementations, the transfer of coded segments may continue until a predetermined number of independent coded segments have been sent to the user or until the user sends an acknowledgement message indicating that enough coded packets (i.e., enough degrees of freedom) have been received to enable decoding to take place. As described previously, in some implementations, the various gateways 16a-16n will be able to communicate with one another. This communication may be wired or wireless communication. When wireless communication is supported, the communication may include both single hop communication and multi hop communication. In some embodiments, gateways may communicate with one another through the ISP 18 or via some other low cost route (e.g., a route other than the Internet).

In some embodiments, a requested movie file may not be stored within, or may not be currently available from, one of the gateway devices 16a-16n. In this scenario, the CDN server 12 may decide to deliver the requested file to the user from its own local storage, or from one or more data centers 26, 28 associated with the CDN 10. In some embodiments, the central server 12 will have all possible movie files stored locally at the server location. In some other embodiments, the movie files may be stored within one or more data centers that are not co-located with the central server. In still others, some of the movie files may be stored at the server location and some at one or more other locations. If a requested file is not available from any source associated with the CDN 10, the CDN server 12 may deny the request.

In accordance with some embodiments described herein, techniques and systems are provided for determining how to arrange content within a CDN in an efficient manner to provide efficient data content distribution within the CDN. More specifically, techniques are provided that allow a CDN to determine which content should be stored within the various gateways of the network to generate relatively low cost operation. In at least one implementation, the CDN server 12 may be configured to determine which content will be stored within which gateway devices 16a-16n to effect efficient and low cost operation. It should be appreciated that this function may alternatively be performed at one or more other locations within CDN 10. In some embodiments, this function may be performed in a distributed manner at numerous locations within the CDN 10.

As will be described in greater detail, in some embodiments, one or more cost functions are defined that gauge the various costs involved with storing content within a CDN. To determine how to arrange content within the CDN, one or more optimization programs may be used to minimize a cost function. Decision variables are defined that can be varied during the optimization process to arrive at a minimal cost function. The final values of the decision variables may then be used to determine which content should be stored within which gateway devices of the CDN 10. A mathematical framework will now be discussed for use in describing exemplary optimization techniques that may be used in accordance with embodiments.

First, a plurality of system variables of a CDN will be defined. The system variables may include, for example:

$X = \{1, \ldots, N\}$: the index set of home gateways, where the total number of gateways is N.

$M = \{1, \ldots, M\}$: the index set of movie files available in the CDN, where the total number of separate movie files is given by M. The Index of each movie is also the rank of popularity of the movie.

$y = (y_1, \ldots, y_M)$: a vector having the size of each of the M movie files. A matrix may be formed by replicating y as $Y = [y, \ldots, y]$.

$C = \{C_1, \ldots, C_N\}$: the transmission capacity of gateway i for outgoing transmissions.

$P_{m,i}$: the probability that there is a demand for movie m at gateway i. P may be the M×N matrix whose entry at position (m, i) is given by $P_{m,i}$ (i.e., the $i^{th}$ column of matrix P gives the probability of demanding each movie at gateway i). In some embodiments, the demand for movies may be assumed to follow a Zipf distribution, which has been established as a good approximation for measuring popularity of video files [see, for example, "I Tube, You Tube, Everybody Tubes: Analyzing the World's Largest User Generated Content Video System;" by Cha et al., *Proc. of the 7th ACM SIGCOMM Conference on Internet Measurement*, ser. IMC '07, New York, N.Y., USA; ACM, 2007, pp. 1-14.] Specifically, a movie with popularity rank j (indexed j) has a demand probability of:

$$P_{m,i} = \frac{1/j^\gamma}{\sum_{k=1}^{M} 1/k^\gamma}$$

where γ characterizes the distribution. As γ→0, the distribution approaches uniform. Unless specified, it will be assumed herein that $P_{m,i}$ is the same for all i.

$c_S$: the cost for the central server to transmit a unit of content to any gateway.

$c_g$: the cost of caching a unit of content at any gateway.

$S_c$: the capacity of the server. This is the maximum average total volume of content that can be transmitted from the server to all users.

$\delta_s$: the upper bound on the server load variance.

α: the delay cost at the server.

As described previously, because all of the users in CDN 10 of FIG. 1 connect to the Internet via a common ISP, it may be assumed that the traffic between the gateways in the CDN 10 has little to no cost. This assumption is practical from the ISP point of view as most of the cost in an ISP is generated from inter-ISP traffic. As long as the traffic load among the gateways is below capacity, the cost for the ISP is not significant.

The decision variables of an exemplary optimization process in accordance with an embodiment are described below:

$x_i = [x_{i,1}, \ldots, x_{i,M}]^T$, $i \in \chi$: the fraction of each movie file M cached at home gateway i.

$X = [x_1, x_2, \ldots, x_N]$: the matrix of vectors $x_i$.

$a_{i,j,m}$: the demand from gateway i of content m from gateway j, if there is a request for m at gateway i. The unit for $a_{i,j,m}$ is in terms of the fraction of content m. The variable $A_m$ may be used to denote the "connectivity matrix" for file m. That is, the entry $a_{i,j,m}$ represents the percentage of file m demanded by gateway i from user j, in the case where gateway i requests file m.

$L_{m,i}$: the fraction of the file m requested to the server by a gateway i, $i \in \chi$, $i \le m \le M$. The corresponding matrix is L.

$g_i$: the storage space used at gateway $i \in \chi$ for caching any content of the M movies.

$g = \{g_1, \ldots, g_N\}$: the vector of g values.

$s_m$: the average total volume of demand of file m from the server.

$s = \{s_1, \ldots, s_N\}$: the vector of $s_i$ values.

$S = \sum_{j=1}^{M} s_j$: the average total volume of content served by the central server to the users.

A number of different optimization problem formulations are provided below in accordance with exemplary embodiments. A first formulation is a baseline linear program (LP) formulation of the problem. Non-linear constraints and objectives are then added on top of the LP formulation to generate desired solutions for different CDN needs (i.e., non-linear formulations). As will be described in greater detail, in each of the formulations, a cost function is to be minimized while placing various constraints and conditions on the decision variables. It should be appreciated that the techniques and strategies discussed herein are not limited to use with the various formulations described herein. That is, other formulations may alternatively be developed for achieving one or more of the functions, results, or benefits of those described herein.

A baseline linear program (LP) formulation will now be described. In at least one embodiment, the LP formulation may be expressed as follows:

(P1: LP Formulation)     Formulation 1

$$\text{minimize } c_s \cdot 1^T s + c_g \cdot 1^T g$$

$$\text{s.t. } y^T x_i \le g_i, \; i \in X$$

$$0 \le x_i \le 1$$

$$0 \le a_{i,j,m} \le x_{j,m}$$

$$a_{i,i,m} = x_{i,m}$$

$$L_{m,i} \ge 1 - \sum_{k=1}^{N} a_{i,k,m} \; m \in M, \; i \in X$$

$$L_{m,i} \ge 0$$

$$\sum_{m=1}^{M} \sum_{\substack{j=1 \\ j \ne i}}^{N} y_m a_{j,i,m} P_{m,j} \le C_i$$

$$s_m = \sum_{i=1}^{N} y_m L_{m,i} P_{m,i}, \; m \in M.$$

The various variables were defined above. The cost function that is minimized by the optimization process is $c_s \cdot 1^T s + c_g \cdot 1^T g$. As is apparent, this function includes a cost term associated with content deliveries from the central server and a cost term associated with content storage at the gateway devices. The various constraints listed above capture the storage and transmission limitations that may be placed on the network and the nodes in an embodiment. These constraints can be generalized to capture different limitations of networking devices and user demands, and can be adapted to different cases. The optimization process will find values for the various decision parameters that will minimize this cost function. These values may then be used to determine which content should be stored at which gateways. In some implementations, it may be assumed that the number of gateways, the movie demand distribution for users behind each gateway, and the number and size of files are known. The goal is thus to find an optimal (or near optimal) caching strategy at the gateways to minimize the cost of movie dissemination over the network.

In the LP formulation described above, there is no constraint imposed on server average load capacity. This is because, in this implementation, it is sufficient to penalize the use of server load in the objective function using $c_s \cdot 1^T s$. The LP formulation ignores the delay cost at the server, which may be highly undesirable in some scenarios. In a modified formulation, therefore, a penalty term may be added to the cost function to account for delay. From queuing theory, it is known that the service delay of a server scales as $$\frac{1}{1-\rho},$$

where $$\rho = \frac{S}{S_c}$$

is the load factor of the server. The new formulation is:

(P2, Service Delay Penalization)     Formulation 2

$$\text{minimize } c_s \cdot 1^T s + c_g \cdot 1^T g + \frac{\alpha}{1 - \frac{S}{S_c}}$$

$$\text{s.t. } \sum_{m=1}^{M} s_m = S$$

$$S \le S_c$$

$X, L, g, s, A_m$ are feasible for P1.

The constraints shown in Formulation 2 above are a simplified version of those described above in connection with Formulation 1. As before, these constraints can be adapted to different settings and user demands.

In a large-scale CDN server or data center, it is often desirable to limit the variation of the server load in order to maintain, for example, system stability and/or power grid stability. Considering such factors, the variance of the server load can be constrained by $\delta_s$ and a modified version of the LP formulation can be solved using nonlinear programming (NLP) techniques in accordance with some embodiments. This formulation may be expressed as:

(*P*3, constrained server load variance)    Formulation 3

$$\text{minimize } c_s \cdot 1^T s + c_g \cdot 1^T g$$

$$\text{s.t. } \sum_{m=1}^{M} s_m = S$$

$$S \leq S_c$$

$$\sum_{i=1}^{N} \sum_{m=1}^{M} P_{m,i}(1 - P_{m,i})(y_m L_{m,i})^2 \leq \delta_s$$

$X$, $L$, $g$, $s$, $A_m$ are feasible for $P1$.

In some implementations, it may be assumed that, for the same gateway, requests for different movie files are independent. As a result, the variance of the server load may be expressed as:

$$\sum_{i=1}^{N} \sum_{m=1}^{M} P_{m,i}(1-P_{m,i})(y_m L_{m,i})^2 - S^2.$$

Techniques for solving the above-described formulations will now be discussed, starting with the LP formulation. In one solution approach, an algorithm was developed to convert the LP formulation into a standard LP problem in the form of:

$$\min c^T x$$

$$\text{s.t. } Ax = b$$

$$x \geq 0.$$

The number of decision variables grows rapidly with N and M using this approach. That is, there are approximately $N^2M + 2MN+M+N$ variables in the original formulation and another $2N^2M+MN+N$ slack variables are needed to convert the problem into the standard form. As a result, the matrix A grows quickly and becomes difficult to compute and manipulate as the size of the problem grows.

The baseline LP formulation of the problem may be solved with at least two different solvers. The interpoint method may be used for LP with logarithmic barrier functions to solve relatively smaller problems (N=10 and N=15, M<60). For larger size problems, the CVX solver may be used (see, e.g., CVX: Matlab Software for Disciplined Convex Programming, version 2.0, July 2013, http://cvxr.com/cvx/; and "Graph Implementations for Nonsmooth Convex Programs," by Grant et al., *Recent Advances in Learning and Control, ser. Lecture Notes in Control and Information Sciences*, Springer Verlag Limited, 2008, pp. 95-110, http://www.stanford.edu/~boyd/papers/pdf/graph_dcp.pdf). The problems were solved with N varying from 10 to 40 and M ranging from 25 to 200. The number of variables involved in the optimization problem ranges from approximately 5,000 to 680,000. While the size of these exemplary solutions is relatively small compared to the ones faced in practical settings, it is believed that these analyzed scenarios provide valuable insight into future large-scale implementations.

Figure 2:
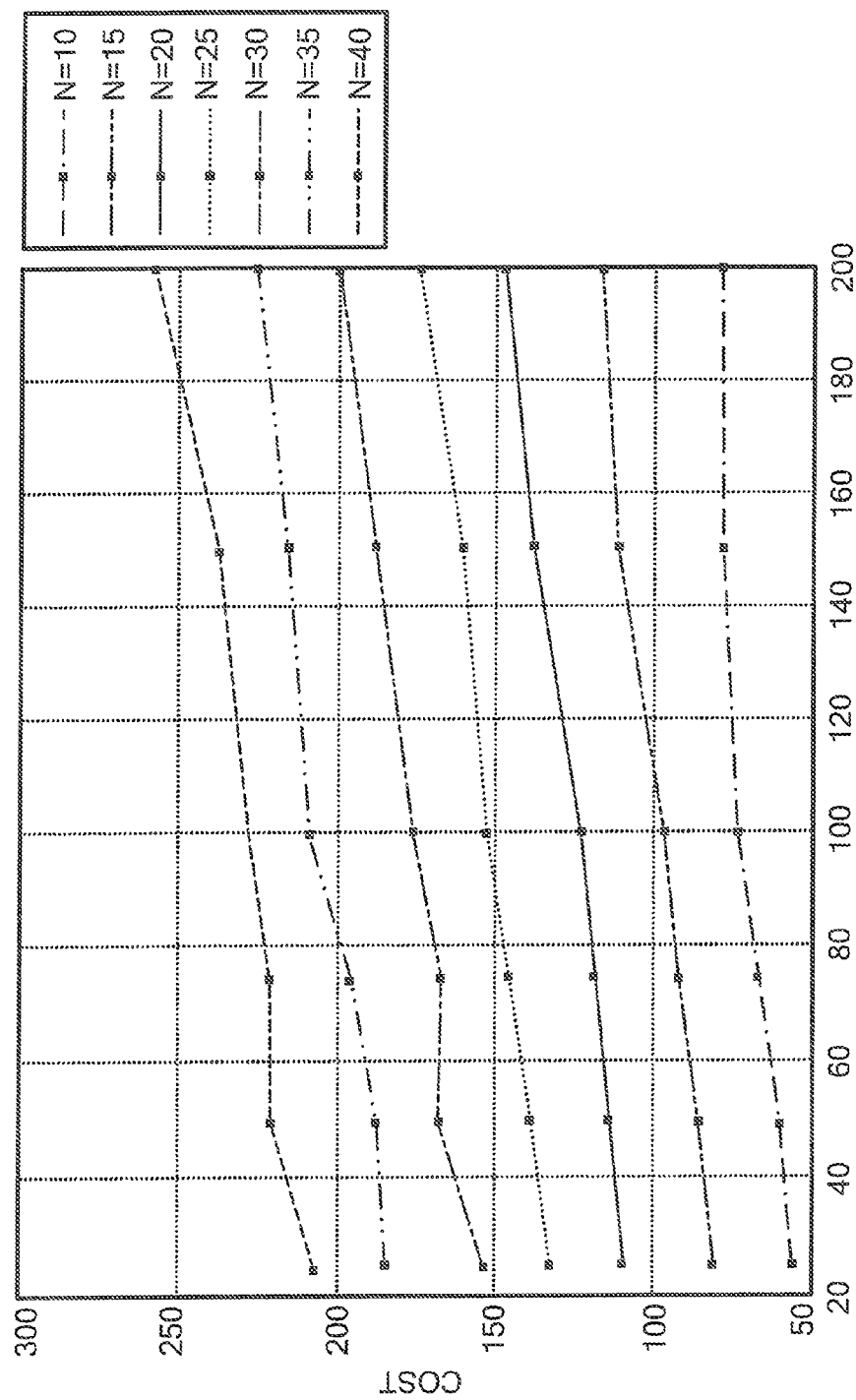
FIG. 2 is a graph illustrating optimal cost values for various numbers of gateways (N) within a CDN as a function of the number of movie files (M) that are available within the CDN.

FIG. 2 is a graph illustrating the optimal cost values for various values of N as the number of movie files increases from 25 to 200, for γ=0.25. In this setting, the movie file sizes are randomly chosen between 800 to 900 Megabytes, while each gateway is allowed to serve a traffic volume of approximately ⅓ to ½ of one movie size to all the other gateways in the network. The cost of caching a unit of content at a gateway is assumed to be considerably lower than the cost of serving a unit of content from the server. As expected, the optimal cost is an increasing function of both N and M. On the other hand, more content tends to be stored at gateways with higher capacity for serving other peers.

With the variance constraint, the problem is a simple quadratic program. The problem is solved using standard quadratic programming techniques. However, due to the size of the input matrix, only settings with relatively small dimensions were tested. As the variance of the server load is tightly constrained, it is observed that server load is rapidly reduced. The results are very intuitive, since the amount of cached content at the gateways increases and the majority of the content distribution happens among the peer gateways.

In at least one embodiment, a generalized first order method may be used to solve the second formulation described above (i.e., Formulation 2 with the service delay penalty). This problem is convex, but the objective function is unbounded within the feasible region. In one approach, an accelerated General Prox Gradient Scheme may be used. The prox functions may include, for example, the square-norm $$\left(\text{i.e., } D(x, y) = \frac{1}{2}\|x - y\|^2\right),$$

considering the standard Euclidean norm (which is self dual). It may be assumed that $S \leq 0.95 S_c$ in order to resolve any issues that might arise due to the unboundedness of the objective function. It should be noted that the initial point of the algorithm should satisfy $S \leq 0.95 S_c$.

Simplifying the notation used, the second formulation will have the general form:

$$\text{minimize } c^T x + \frac{1}{1 - \frac{S}{S_c}}$$

$$\text{s.t. } a^T x = S$$

$$x \in \chi$$

$$S \leq S_c$$

where $\chi$ is the feasible region of Formulation 1. Note that the objective function above can be expressed as $P(S)+f(S)$, where $P(\cdot)$ is the optimum of a linear program and $f(S)$ is the non-linear penalty. Assuming $0 \leq S \leq 0.95 S_c$, it is noted that $\|f'(y)-f'(x)\| \leq L\|y-x\|$ for $L=400/S_c$.

At each iteration of the gradient descent scheme, a standard quadratic program is solved. The main step of each iteration is given below:

$$y^i \leftarrow (1 - \theta_i)x^i + \theta_i z^i,$$

$$z^{i+1} \leftarrow \text{argsmin}$$

$$\left\{c^T x + \frac{S_c}{y^i - S_c}(S - y^i) + \frac{L}{2}\|S - z^i\|_2^2, \text{ s.t. } a^T x = S, x \in X, S \leq S_c\right\}$$

$$x^{i+1} \leftarrow (1 - \theta_i)x^i + \theta_i z^{i+1}.$$

Figure 3:
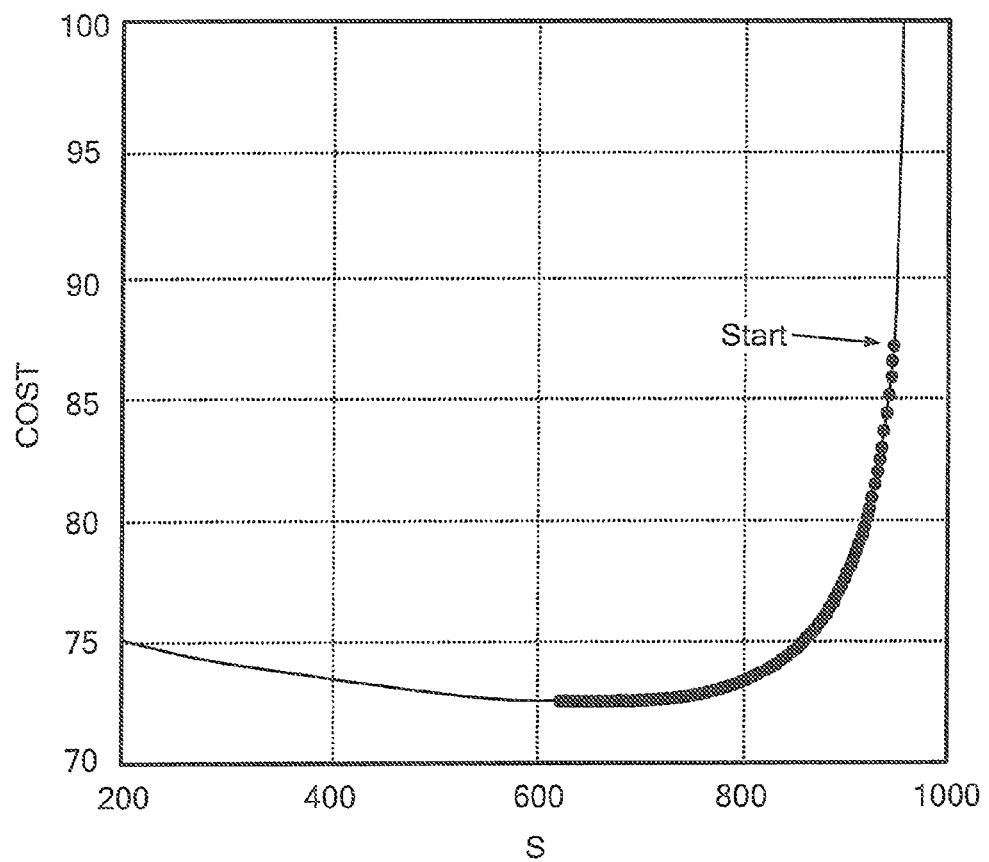
FIG. 3 is a graph illustrating the convergence of an optimization process in accordance with an embodiment.

The previous problem is a standard convex problem and can be solved using any convex programming tools. In one implementation, CVX was used due to speed constraints. FIG. 3 shows the convergence of the evolution of the method for 500 iterations. The algorithm clearly converges to the optimal solution, as expected.

Figure 4:
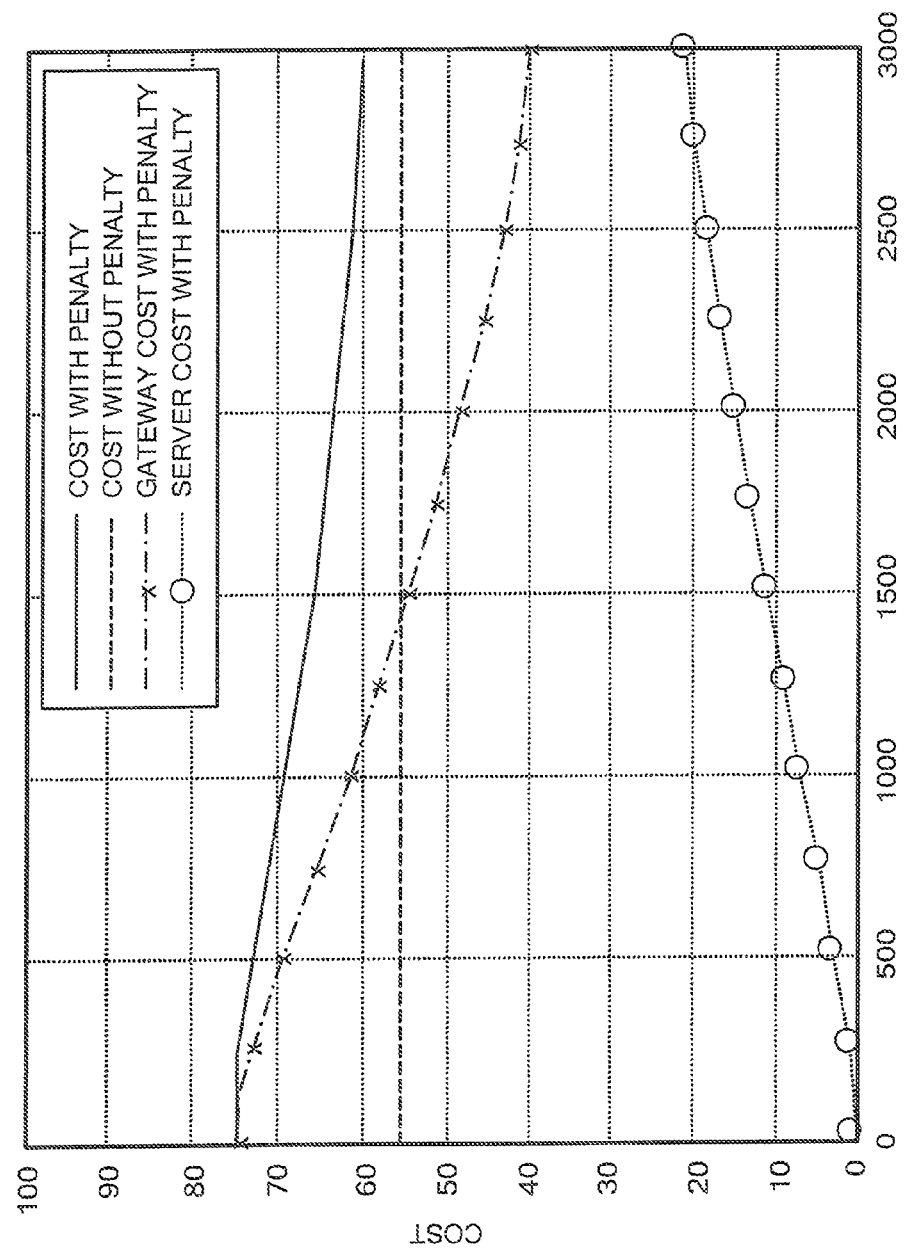
FIG. 4 is a graph illustrating various costs as a function of server capacity for a CDN in accordance with an embodiment.

FIG. 4 is a graph illustrating the different costs $c_s \cdot 1^T s + c_g \cdot 1^T g$ for different values of $S_c$. It is noted that the cost does not include the delay penalty. Clearly, as $S_c$ increases, the total cost converges to the cost without penalty constraint. Furthermore, the component of the cost due to the server load increases at a lower rate than the decrease of the storage cost at the gateways. This indicates that, for practical designs, the server plays an important role in offloading the storage requirements at the gateways, even when considering a significant penalty for delay. In addition, costs can be achieved that are at most 10% from the optimal, while guaranteeing reasonable delay constraints.

Figure 5:
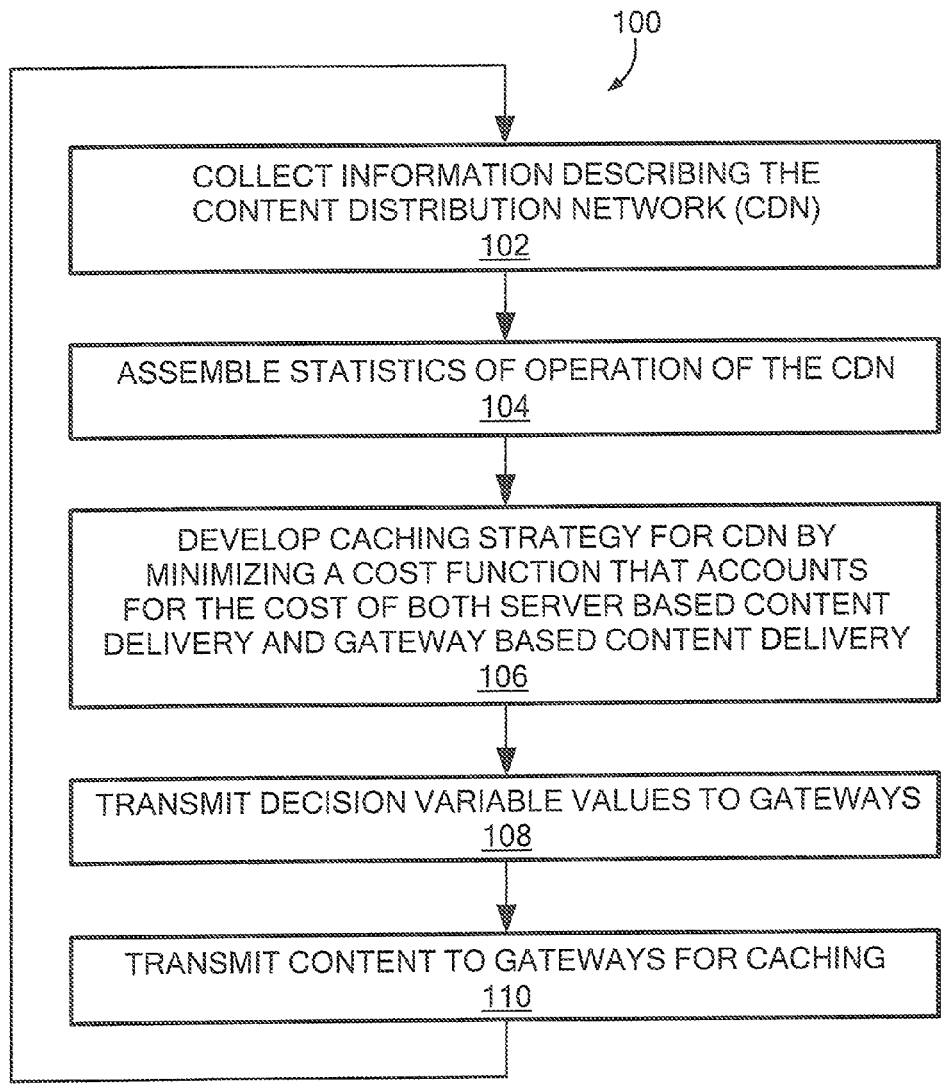
FIG. 5 is a flow diagram illustrating an exemplary method for operating a CDN that uses DCC in accordance with an embodiment.

FIG. 5 is a flow diagram illustrating an exemplary method 100 for operating a CDN that uses DCC in accordance with an embodiment.

The rectangular elements (typified by element 102 in FIG. 5) are herein denoted "processing blocks" and may represent computer software instructions or groups of instructions. It should be noted that the flow diagram of FIG. 5 represents one exemplary embodiment of the design described herein and variations in such a diagram, which generally follow the process outlined, are considered to be within the scope of the concepts, systems, and techniques described and claimed herein.

Alternatively, the processing blocks may represent operations performed by functionally equivalent circuits such as a digital signal processor circuit, an application specific integrated circuit (ASIC), or a field programmable gate array (FPGA). Some processing blocks may be manually performed while other processing blocks may be performed by a processor or other circuit. The flow diagram does not depict the syntax of any particular programming language. Rather, the flow diagram Illustrates the functional Information one of ordinary skill in the art requires to fabricate circuits and/or to generate computer software to perform the processing required of the particular apparatus. It should be noted that many routine program elements, such as initialization of loops and variables and the use of temporary variables may not be shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIG. 5 can be performed in any convenient or desirable order.

The method 100 of FIG. 5 assumes that a CDN of interest has a number of gateways located at or close to user locations that have ample digital storage space for use in content caching. Referring now to FIG. 5, information may be collected by the CDN that relates to the overall makeup of the CDN (block 102). This information may include, for example, information about the number and identities of network gateways associated with the CDN, information about the number, identity, and size of movie files (and/or other types of files) associated with the CDN, information about the transmission capacity of the gateways associated with the CDN, information about the capacity of the server, cost Information related to delivery of content from the central server, cost information related to caching content at the gateways, and/or other information. Information may also be assembled that relates to certain statistics of operation of the CDN (block 104). Some or all of this statistical information may relate to statistics associated with user preferences and requirements in the CDN. This information may include, for example, probabilities related to movie demand at the various gateways associated with the CDN, popularity rank of the various movie files, information related to demand for specific movies at one gateway that is cached at a different gateway, information related to storage space used at various gateways for caching movie content, average total volume of demand for different movies, and/or other information.

A strategy for caching content at the gateways of the CDN that will result in efficient delivery of content to users may next be developed by minimizing a cost function for CDN operation that takes into account costs associated with both server based content delivery and gateway based content delivery (block 106). The cost function minimization process will typically generate values for one or more decision variables that may then be used to determine which items of content should be cached within which gateways. In some embodiments, one or more well known optimization techniques may be used to minimize the cost function. These optimization techniques may include, for example, the General Prox Gradient Scheme, the interior point method, and numerical solvers such as GUROBI and CVX. Custom optimization procedures may alternatively be developed. In some implementations, one of the formulations described herein (i.e., Formulation 1, 2, or 3) may be used for the cost function. Other formulations may alternatively be used. The particular formulation that is used may depend upon the specific characteristics of the CDN being implemented. For example, in a CDN where server delays might be significant, an operator may decide to use Formulation 2 described above that includes a server delay penalty. In a CDN where variance in server load may present a problem, an operator may decide to use Formulation 3 that places a constraint on server load variance.

After values for the different decision variables have been generated, some or all of these values may be transmitted to the gateways of the CDN (block 108). As described above, the decision variable values will be used by the CDN (e.g., the central server) to determine how the content will be cached within the gateways. The content will then be distributed to the various gateway devices in the desired manner for caching (block 110). When new cache content is received by a gateway, the gateway may discard previously stored cache content before storing the new content in some embodiments. In some embodiments, the central server may determine which content currently stored within a particular gateway should be deleted and which new content should be added and instruct the gateway to do this. Using this approach, only the new content needs to be delivered to the gateway.

In some embodiments, the method 100 of FIG. 5 may be performed in a repetitive fashion during the life of a CDN. For example, the CDN may be configured to repeat the method 100 periodically, continually, or at fixed times. Alternatively, or in addition, the CDN may be configured to repeat the method 100 whenever a predetermined condition is detected. In some implementations, the CDN may be configured to that an operator can manually initiate the method 100 when the operator feels that inefficiencies may exist in the CDN. The goal of the method 100 may be to achieve a content caching scheme in the gateways of a CDN that results in efficient content delivery to users. This efficient content delivery may allow users to access content in a timely manner with enhanced quality of service (QoS). Ideally, an optimal caching strategy will be developed that will minimize the cost of movie dissemination in the CDN, but efficient caching schemes that are less than optimal may also be generated.

In one approach, the method 100 will be executed primarily within a central server of a corresponding CDN. However, execution at other locations, including distributed execution at multiple locations, may also be used. In some embodiments, it may be assumed that any piece of a movie file cached and transmitted in a network is already network coded.

As described above, in some embodiments, network coding or some other coding technique may be used to encode content that will be stored within the CDN. When a user later requests the content, the coded content may be delivered to the user and the user will have to decode the content before using it. For example, in a CDN that uses network coding to encode stored movie files, each movie file may be divided into a number of different segments. Random coefficients may then generated for each of the segments. A linear combination of the different segments, weighted by the random coefficients, may then be generated to form a coded segment as follows:

$$\text{coded segment} = \sum_{i=1}^{N} a_i S_i$$

where $a_i$ are the random coefficients, $S_i$ are the file segments, and N is the number of file segments. A number of additional coded segments may then be generated using the same file segments with different random coefficients. A random number generator may be used to generate the random coefficients. The actual coefficients used to generate a coded segment may be appended to each coded segment for eventual use in decoding. The coded segments may then be stored at various locations within a CDN. It should be appreciated that the above described technique for implementing network coding in a CDN represents one possible way to use network coding. Other approaches are also possible.

When a user subsequently requests a particular movie file, the CDN may deliver coded packets to the user corresponding to that movie file from whatever location they are stored in. Significantly, because the segments are coded, there will be no sequencing involved in delivering the segments to the user. That is, segments can be retrieved from any location and delivered to the user without having to keep track of sequence numbers. The user will have to successfully receive a certain number of coded segments to be able to decode the content. The number of coded segments required will typically be the same as the number of file segments N that the file was originally divided into. In addition, the coded segments that are received must be linearly independent of one another to be useful in the decoding process. The use of randomly generated coefficients will typically result in each stored coded segment being linearly independent of the other coded segments. The decoding process typically involves solving N linear equations for N unknowns.

In one possible approach, a CDN may continue to send coded segments to a requesting user until an acknowledgement (ACK) message is received from the user indicating that sufficient segments have been received. Alternatively, a CDN may initially send a fixed number of coded segments (e.g., N or greater) to the user and only send more if the user indicates that more are needed. As will be appreciated, other techniques for managing delivery of coded segments may alternatively be used.

Because N coded packets are needed to decode, the CDN may generate and store more than N coded packets for a particular file. The number of segments used and the size of the segments may vary. In the method 100 described above, and similar methods, the process of minimizing the cost function may take into account the use of, or the availability of, network coding in the CDN to determine a caching scheme for the CDN. A caching scheme may then be developed that identifies which gateways are to cache coded segments associated with particular content files. It should be appreciated that coding schemes other than network coding may be used in other implementations. Some other coding schemes that may be used include, for example, the Reed Solomon (RS) code and other MDS codes, but random linear codes make the encoding easier.

In the discussion above, various exemplary embodiments have been described. It will be apparent to those of ordinary skill in the art that modifications and variations may be made to these exemplary embodiments without departing from the spirit and scope of the disclosed subject matter. These modifications and variations are considered to be within the purview and scope of the appended claims.

What is claimed is:

1. A machine implemented method for use in a content delivery network (CDN) that distributes content to a plurality of users, the CDN having a central server to manage content delivery services and a plurality of gateway devices located proximate to user locations that have data storage capability for use in caching at least some of the content to be distributed in the CDN, the method comprising:
by the central server:
determining information describing the CDN, the information comprising information describing a configuration and a capacity of the CDN;
determining statistics of operation of the CDN corresponding to user content requirements;
determining content to be stored at the plurality of gateway devices by using a cost function associated with content delivery, wherein the cost function includes a cost term associated with content delivery from the central server and a cost term associated with content delivery from the gateway devices, wherein determining content includes using the determined information and the determined statistics; and
sending content to the plurality of gateway devices to be cached thereby in accordance with the results of determining content to be stored, wherein the content comprises network coded file segments corresponding to linear combinations of a plurality of file fragments weighted by coding coefficients.

2. The method of claim 1, wherein:
collecting, assembling, determining, and sending are performed at the central server.

3. The method of claim 1, further comprising:
continually repeating collecting, assembling, determining, and sending to operate the CDN in an efficient manner.

4. The method of claim 1, wherein:
the cost function is based on at least one of: a term to account for delivery delays at the server, and a constraint on server load variance.

5. The method of claim 1, wherein:
determining content to be stored at the plurality of gateway devices includes using at least one of the following optimization procedures to minimize the cost function: the General Prox Gradient Scheme, the interior point method, and numerical solvers such as GUROBI and CVX.

6. The method of claim 1, wherein:
sending content to the plurality of gateway devices to be cached thereby includes sending the content via the Internet.

7. The method of claim 6, wherein:
the plurality of gateway devices associated with the CDN communicate with the Internet through a common Internet Service Provider (ISP), wherein the central server is connected to the Internet.

8. The method of claim 1, wherein:
sending content to the plurality of gateway devices includes causing at least some of the content to be sent to the gateway devices from one or more data centers that are not located at the central server location.

9. A content delivery network (CDN) to provide content delivery services for a plurality of users, the CDN comprising:
a content delivery server configured to:
manage content delivery services for the CDN;
determine a caching scheme for the CDN for caching selected content at a plurality of gateway devices deployed at or near user locations, the caching scheme to enhance the efficiency with which content is delivered to users, the caching scheme determined based on information describing a configuration and a capacity of the CDN and using a cost function associated with content delivery, the cost function including a cost term associated with content delivery from the gateway devices and a cost term associated with content delivery from one or more other content storage locations of the CDN; and
deliver network coded content to individual gateway devices in the plurality of gateway devices for storage in accordance with the caching scheme, wherein the network coded content comprises corresponds to linear combinations of a plurality of content fragments weighted by coding coefficients.

10. The CDN of claim 9, wherein:
the plurality of gateway devices deployed at or near the user locations are under the control of the CDN.

11. The CDN of claim 9, wherein:
the content delivery server is configured to occasionally update the caching scheme to account for changes in the CDN over time.

12. The CDN of claim 9, wherein:
the content delivery server is coupled to the plurality of gateway devices through the Internet.

13. The CDN of claim 12, wherein:
the plurality of gateway devices are all associated with a common Internet service provider (ISP).

14. The CDN of claim 9, wherein the content delivery server is configured to:
collect information about a present configuration of the CDN;
assemble statistics of operation of the CDN corresponding to user content requirements; and
use the collected information and the assembled statistics to develop the caching scheme for the CDN.

15. The CDN of claim 9, wherein:
the cost function is based on at least one of: a cost for the content delivery server to transmit a unit of content to a gateway, a cost of caching a unit of content at a gateway.

16. The CDN of claim 9, wherein:
the cost function is based on at least one of: a term to account for delivery delays at the server, and a constraint on server load variance.

17. A non-transitory computer readable media having instructions stored thereon that, when executed by a computing system, performs a method for use in a content delivery network (CDN) that distributes content to a plurality of users, the CDN having a central server to manage content delivery services and a plurality of gateway devices located proximate to user locations that have data storage capability for use in caching at least some of the content to be distributed in the CDN, the method comprising:
by the central server:
determining information describing the CDN, the information comprising information describing a configuration and a capacity of the CDN;
determining statistics of operation of the CDN corresponding to user content requirements;
determining content to be stored at the plurality of gateway devices by using a cost function associated with content delivery, wherein the cost function includes a cost term associated with content delivery from the server and a cost term associated with content delivery from the gateway devices, wherein determining content includes using the determined information and the determined statistics; and
sending content to the plurality of gateway devices to be cached thereby in accordance with the results of determining content to be stored, wherein the content comprises network coded packets corresponding to linear combinations of a plurality of packets weighted by coding coefficients.

18. The non-transitory computer readable media of claim 17, wherein:
the cost function is based on at least one of: a term to account for delivery delays at the server, and a constraint on server load variance.

19. A machine implemented method for use in a content delivery network (CDN) that distributes content to a plurality of users, the CDN having a central server to manage content delivery services and a plurality of gateway devices located proximate to user locations that have data storage capability for use in caching at least some of the content to be distributed in the CDN, the method comprising, by the central server:
determining information describing the CDN, the information comprising information describing a configuration and a capacity of the CDN;
determining statistics of operation of the CDN corresponding to user content requirements;
determining content to be stored at the plurality of gateway devices by using a cost function associated with content delivery, wherein the cost function accounts for costs associated with content delivery from the central server and costs associated with content delivery from the gateway devices, wherein determining content includes using the determined information and the determined statistics; and
sending content to the plurality of gateway devices to be cached thereby in accordance with the results of determining content to be stored, wherein the content comprises network coded packets corresponding to linear combinations of a plurality of packets weighted by coding coefficients
wherein the cost function is based on at least one of:
a cost term associated with content deliveries from the central server comprising at least one of a term to account for delivery delays at the server and a term to account for constraints on server load variance; and
a cost term associated with content storage at the gateway devices.

* * * * *